United States Patent
Kornmann

(10) Patent No.: US 10,942,618 B2
(45) Date of Patent: Mar. 9, 2021

(54) PANNING IN A THREE DIMENSIONAL ENVIRONMENT ON A MOBILE DEVICE

(71) Applicant: Google LLC, Mountain View, CA (US)

(72) Inventor: David Kornmann, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/291,063

(22) Filed: Mar. 4, 2019

(65) Prior Publication Data

US 2019/0205009 A1    Jul. 4, 2019

Related U.S. Application Data

(60) Division of application No. 15/095,442, filed on Apr. 11, 2016, now Pat. No. 10,222,931, which is a (Continued)

(51) Int. Cl.
*G06F 3/0481* (2013.01)
*G06F 1/16* (2006.01)
(Continued)

(52) U.S. Cl.
CPC ........ *G06F 3/04815* (2013.01); *G06F 1/1626* (2013.01); *G06F 3/017* (2013.01); (Continued)

(58) Field of Classification Search
CPC combination set(s) only.
See application file for complete search history.

(56) References Cited

U.S. PATENT DOCUMENTS

| 5,111,288 A | * | 5/1992 | Blackshear | ...... G08B 13/19619 348/143 |
| 5,483,261 A | | 1/1996 | Yasutake | |

(Continued)

FOREIGN PATENT DOCUMENTS

EP    1369822    12/2003

OTHER PUBLICATIONS

Wilson, Robust Computer Vision-Based Detection of Pinching for One and Two-Handed Gesture Input, UIST '06: Proceedings of the 19th annual ACM symposium on user interface software and technology, Oct. 2006, pp. 255-258 (Year: 2006).*

(Continued)

*Primary Examiner* — Motilewa Good Johnson
(74) *Attorney, Agent, or Firm* — Dority Manning, P.A.

(57) ABSTRACT

This invention relates to panning in a three dimensional environment on a mobile device. In an embodiment, a computer-implemented method for navigating a virtual camera in a three dimensional environment on a mobile device having a touch screen. A user input is received indicating that an object has touched a first point on a touch screen of the mobile device and the object has been dragged to a second point on the touch screen. A first target location in the three dimensional environment is determined based on the first point on the touch screen. A second target location in the three dimensional environment is determined based on the second point on the touch screen. Finally, a three dimensional model is moved in the three dimensional environment relative to the virtual camera according to the first and second target locations.

20 Claims, 19 Drawing Sheets

Related U.S. Application Data continuation of application No. 12/546,261, filed on Aug. 24, 2009, now Pat. No. 9,310,992.

(60) Provisional application No. 61/091,234, filed on Aug. 22, 2008.

(51) Int. Cl.
*G06F 3/0488* (2013.01)
*G06T 19/00* (2011.01)
*G06F 3/01* (2006.01)
*G06F 3/0485* (2013.01)

(52) U.S. Cl.
CPC .......... *G06F 3/0485* (2013.01); *G06F 3/0488* (2013.01); *G06F 3/04883* (2013.01); *G06T 19/003* (2013.01); *G06T 2200/1637* (2013.01); *G06T 2200/24* (2013.01)

(56) References Cited

U.S. PATENT DOCUMENTS

| | | |
|---|---|---|
| 5,557,714 A | 9/1996 | Lines et al. |
| 5,588,098 A | 12/1996 | Chen et al. |
| 5,602,566 A | 2/1997 | Motosyuku et al. |
| 5,844,547 A | 12/1998 | Minakuchi et al. |
| 6,029,854 A | 2/2000 | Wissen |
| 6,281,877 B1 * | 8/2001 | Fisher ............... G06F 3/011 345/419 |
| 6,288,704 B1 | 9/2001 | Flack et al. |
| 6,323,846 B1 * | 11/2001 | Westerman ............ G06F 3/044 345/173 |
| 6,326,846 B1 | 12/2001 | Brandt |
| 6,347,290 B1 | 2/2002 | Bartlett |
| 6,388,655 B1 | 5/2002 | Leung |
| 6,400,376 B1 | 6/2002 | Singh et al. |
| 6,466,198 B1 | 10/2002 | Feinstein |
| 6,690,387 B2 | 2/2004 | Zimmerman et al. |
| 6,798,429 B2 | 9/2004 | Bradski |
| 6,864,886 B1 | 3/2005 | Cavallaro et al. |
| 6,907,579 B2 * | 6/2005 | Chang ............... G06T 19/003 345/418 |
| 6,957,380 B2 | 10/2005 | Lee et al. |
| 6,980,690 B1 | 12/2005 | Taylor et al. |
| 6,987,512 B2 * | 1/2006 | Robertson ........... G06F 3/04815 345/156 |
| 7,030,861 B1 * | 4/2006 | Westerman ......... G06F 3/04883 345/173 |
| 7,042,449 B2 | 5/2006 | Khan |
| 7,126,579 B2 * | 10/2006 | Ritter ................ G01C 21/3638 345/156 |
| 7,142,205 B2 | 11/2006 | Chithambaram et al. |
| 7,159,194 B2 | 1/2007 | Wong et al. |
| 7,190,496 B2 | 3/2007 | Klug et al. |
| 7,259,778 B2 | 8/2007 | Arpa et al. |
| 7,271,795 B2 | 9/2007 | Bradski |
| 7,330,198 B2 | 2/2008 | Yamaguchi et al. |
| 7,477,243 B2 | 1/2009 | Ogawa et al. |
| 7,508,977 B2 | 3/2009 | Lyons et al. |
| 7,519,223 B2 * | 4/2009 | Dehlin ................ G06F 3/0354 345/173 |
| 7,587,684 B2 | 9/2009 | Perttula |
| 7,613,323 B2 | 11/2009 | Nister et al. |
| 7,628,698 B2 | 12/2009 | Ajioka et al. |
| 7,707,516 B2 | 4/2010 | O'Mullan et al. |
| 7,728,821 B2 | 6/2010 | Hills et al. |
| 7,746,343 B1 * | 6/2010 | Charaniya ........... G06F 16/9537 345/428 |
| 7,819,748 B2 | 10/2010 | Ajioka |
| 7,859,553 B2 | 12/2010 | Bae |
| 7,934,893 B2 | 5/2011 | Gillissen |
| 8,018,435 B2 | 9/2011 | Orchard et al. |
| 8,077,153 B2 | 12/2011 | Benko et al. |
| 8,106,856 B2 * | 1/2012 | Matas ................ H04N 5/2257 345/73 |
| 8,130,203 B2 | 3/2012 | Westerman |
| 8,142,277 B2 | 3/2012 | Kato et al. |
| 8,294,766 B2 | 10/2012 | Tsai et al. |
| 8,302,033 B2 | 10/2012 | Matas et al. |
| 8,681,104 B2 * | 3/2014 | Westerman ............ G06F 3/038 345/173 |
| 8,799,821 B1 * | 8/2014 | De Rose ............ G06F 3/04842 715/848 |
| 8,847,992 B2 | 9/2014 | Kornmann et al. |
| 9,310,992 B2 | 4/2016 | Kornmann |
| 10,180,714 B1 * | 1/2019 | Kin .................... G06F 3/01 |
| 10,504,285 B2 * | 12/2019 | Fitzmaurice ........ G06F 3/04815 |
| 2003/0132913 A1 | 7/2003 | Issinski |
| 2004/0051709 A1 | 3/2004 | Ogawa et al. |
| 2004/0125114 A1 | 7/2004 | Schmidt et al. |
| 2004/0128071 A1 | 7/2004 | Schradi |
| 2004/0178997 A1 | 9/2004 | Gillespie et al. |
| 2005/0187015 A1 | 8/2005 | Suzuki et al. |
| 2005/0225559 A1 | 10/2005 | Robertson et al. |
| 2006/0026521 A1 | 2/2006 | Hotelling et al. |
| 2006/0097991 A1 | 5/2006 | Hotelling et al. |
| 2006/0164382 A1 | 7/2006 | Kulas et al. |
| 2006/0244735 A1 | 11/2006 | Wilson |
| 2006/0288313 A1 | 12/2006 | Hillis |
| 2007/0257891 A1 * | 11/2007 | Esenther ................ G06F 3/044 345/173 |
| 2008/0042987 A1 | 2/2008 | Westerman et al. |
| 2008/0070684 A1 | 3/2008 | Haigh-Hutchinson |
| 2008/0094358 A1 | 4/2008 | Sullivan |
| 2008/0180405 A1 | 7/2008 | Han et al. |
| 2008/0180406 A1 | 7/2008 | Han et al. |
| 2008/0184173 A1 | 7/2008 | Sutanto et al. |
| 2008/0309632 A1 | 12/2008 | Westerman et al. |
| 2009/0100366 A1 * | 4/2009 | Fitzmaurice ............ G06T 15/20 715/767 |
| 2009/0256840 A1 | 10/2009 | Varadhan et al. |
| 2009/0259976 A1 | 10/2009 | Varadhan et al. |
| 2009/0262145 A1 | 10/2009 | Akita et al. |
| 2009/0292989 A1 | 11/2009 | Matthews et al. |
| 2010/0045666 A1 | 2/2010 | Kornmann et al. |

OTHER PUBLICATIONS

Malik et al., Visual Touchpad: A Two-handed Gestural Input Device, ICMI '04: Proceedings of the 6th international conference on Multimodal interfaces, Oct. 2004, pp. 289-296 (Year: 2004).*

O'Hagan et al. Visual gestures, Elsevier, Interacting with Computers, 2002, pp. 231-250 (Year: 2002).*

Matsushita et al., "Dual Touch: A Two-Handed Interface for Pen-Based PDAs", Interaction Laboratory, Sony Computer Science Laboratories Inc., Proceedings of the 13$^{th}$ Annual ACM Symposium on User Interface Software and Technology, Tokyo, Japan, pp. 211-212.

PCT, Notification of Transmittal of the International Search Report and the Written Opinion of the International Searching Authority, or the Declaration and Written Opinion of the International Search Authority; dated Sep. 23, 2010; International Application. No. PCT/US2009/043727, International Filing Date: Aug. 24, 2009, 14 pages.

* cited by examiner

PANNING IN A THREE DIMENSIONAL ENVIRONMENT ON A MOBILE DEVICE

The present application is a divisional of U.S. application Ser. No. 15/095,442 having a filing date of Apr. 11, 2016, which is a continuation of U.S. application Ser. No. 12/546,261 having a filing date of Aug. 24, 2009, which claims the benefit of U.S. Provisional Pat. Appl. No. 61/091,234, filed Aug. 22, 2008. Applicant claims priority to and benefit of all such applications and incorporates all such applications herein by reference.

BACKGROUND

Field of the Invention

This invention generally relates to navigation in a three dimensional environment.

Background Art

Systems exist for navigating through a three dimensional environment to display three dimensional data. The three dimensional environment includes a virtual camera that defines what three dimensional data to display. The virtual camera has a perspective according to its position and orientation. By changing the perspective of the virtual camera, a user can navigate through the three dimensional environment.

Mobile devices, such as cell phones, personal digital assistants (PDAs), portable navigation devices (PNDs) and handheld game consoles, are being made with improved computing capabilities. Many mobile devices can access one or more networks, such as the Internet. Also, some mobile devices, such as an IPHONE device available from Apple Inc., accept input from GPS sensors, accelerometers and touch screens. Improved computing capabilities make it possible to run a wide variety of software applications on mobile devices. Despite improved computing capabilities, many handheld mobile devices have a small display— generally less than 4 inches across. The small display may make it difficult for a user to navigate through a three dimensional environment on a mobile device.

Methods and systems are needed that improve navigation in a three dimensional environment on a mobile device.

BRIEF SUMMARY

This invention relates to panning in a three dimensional environment on a mobile device. In a first embodiment, a computer-implemented method for navigating a virtual camera in a three dimensional environment on a mobile device having a touch screen. A user input is received indicating that an object has touched a first point on a touch screen of the mobile device and the object has been dragged to a second point on the touch screen. A first target location in the three dimensional environment is determined based on the first point on the touch screen. A second target location in the three dimensional environment is determined based on the second point on the touch screen. Finally, A three dimensional model is moved in the three dimensional environment relative to the virtual camera according to the first and second target locations.

In a second embodiment, a system navigates a virtual camera m a three dimensional environment on a mobile device. The system includes a touch receiver that receives a user input indicating that an object has touched a first point on a touch screen of the mobile device and the object has been dragged to a second point on the touch screen. A target module determines a first target location in the three dimensional environment based on the first point on the touch screen and determines a second target location in the three dimensional environment based on the second point on the touch screen. Finally, a pan module moves a three dimensional model in the three dimensional environment relative to the virtual camera according to the first and second target locations.

In a third embodiment, a computer-implemented method for navigating a virtual camera in a three dimensional environment on a mobile device having a touch screen. A user input is received indicating that an object has touched a first point on a screen of the mobile device and the object has been dragged to a second point on the touch screen. An orientation of the mobile device is received. A panning mode is determined from a plurality of panning modes based on the orientation of the model device.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments of the present invention provide for navigation m a three dimensional environment on a mobile device. In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

This detailed description is divided into sections. The first section provides an introduction to navigation through three dimensional environment on a mobile device. The second section describes a system that accepts user interface gestures to navigate in a three dimensional environment on a mobile device. The next several sections describe the user interface gestures in greater detail. The third section describes an angular zoom user interface gesture. The fourth section describes two anchored navigation gestures. The fifth section describes a dual finger look-around gesture. The sixth section describes accelerometer navigation. The seventh section describes pitch momentum and a two-finger touch and rotate gesture. Finally, the eight section describes panning in a three dimensional environment on a mobile device.

Introduction

Figure 1:
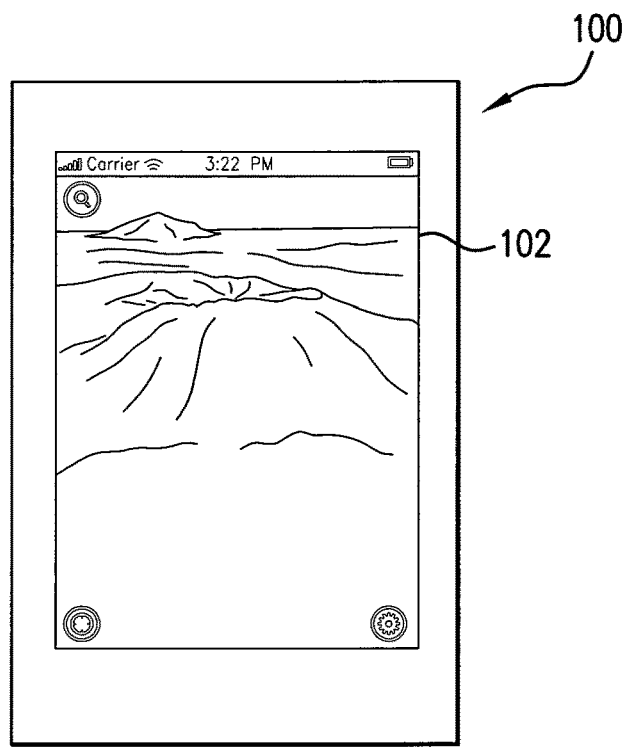
FIG. 1 is a diagram illustrating a mobile device that navigates through a three dimensional environment.

This section provides an overview of navigation m a three dimensional environment on a mobile device. FIG. 1 is a diagram illustrating a mobile device 100 that can navigate through a three dimensional environment. In embodiments, mobile device 100 may be a PDA, cell phone, handheld game console or other handheld mobile device as known to those of skill in the art. In an example, mobile device 100 may be an IPHONE device, available from Apple Inc. In another example, mobile device 100 may be a device running an ANDROID platform, available from Google Inc. In other further embodiments, mobile device 100 may be a tablet computer, laptop computer, or other mobile device larger than a handheld mobile device but still easily carried by a user. These examples are illustrative and are not meant to limit the present invention.

Mobile device 100 may have a touch screen that accepts touch input from the user. The user may touch the screen with his fingers, stylus, or other means known to those skilled in the art. Mobile device 100 also may have an accelerometer that detects when the mobile device accelerates or detects mobile device 100's orientation relative to gravity. It should be noted that other devices may be user to determine mobile device 100's orientation, and this invention is not meant to be limited to an accelerometer. Further one or more accelerometers may be used. Further, mobile device 100 may have a location receiver, such as a GPS receiver, and may be connected to one or more networks such as the Internet.

Mobile device 100 has a view 102. As mentioned earlier, mobile device 100 may accept touch input when a user touches view 102. Further, view 102 may output images to user. In an example, mobile device 100 may render a three dimensional environment and may display the three dimensional environment to the user in view 102 from the perspective of a virtual camera.

Mobile device 100 enables the user to navigate a virtual camera through a three dimensional environment. In an example, the three dimensional environment may include a three dimensional model, such as a three dimensional model of the Earth. A three dimensional model of the Earth may include satellite imagery texture mapped to three dimensional terrain. The three dimensional model of the Earth may also include models of buildings and other points of interest. This example is merely illustrative and is not meant to limit the present invention.

In response to user input, mobile device 100 may change a perspective of the virtual camera. Based on the virtual camera's new perspective, mobile device 100 may render anew image into view 102. Various user interface gestures that change the virtual camera's perspective and result in anew image are described in detail below.

Figure 2:
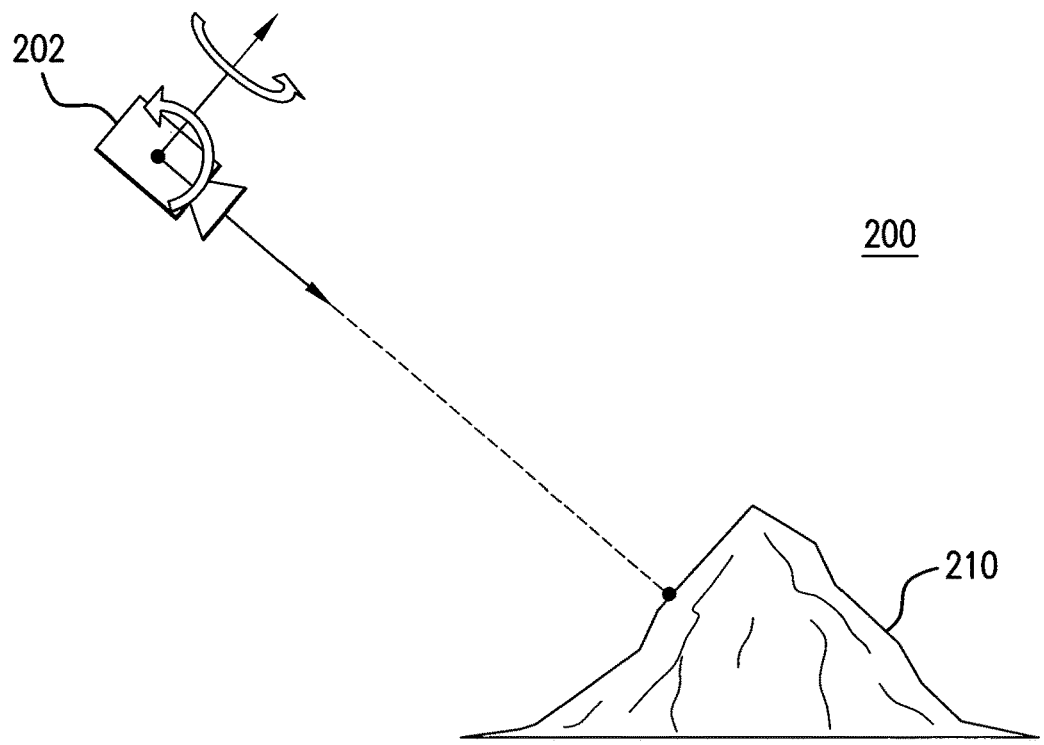
FIG. 2 is a diagram illustrating a virtual camera navigating through a three dimensional environment.

FIG. 2 shows a diagram 200 illustrating a virtual camera in a three dimensional environment. Diagram 200 includes a virtual camera 202. Virtual camera 202 is directed to view a three dimensional terrain 210. Three dimensional terrain 210 may be a portion of a larger three dimensional model, such as a three dimensional model of the Earth.

As mentioned earlier, user input may cause a mobile device, such as mobile device 100 in FIG. 1, to move virtual camera 202 to a new location. Further, user input may cause virtual camera 202 to change orientation, such as pitch, yaw, or roll.

In this way, user interface gestures on a mobile device cause a virtual camera to navigate through a three dimensional environment on a mobile device. The various system components and details of the user interface gestures are described below.

System

Figure 3:
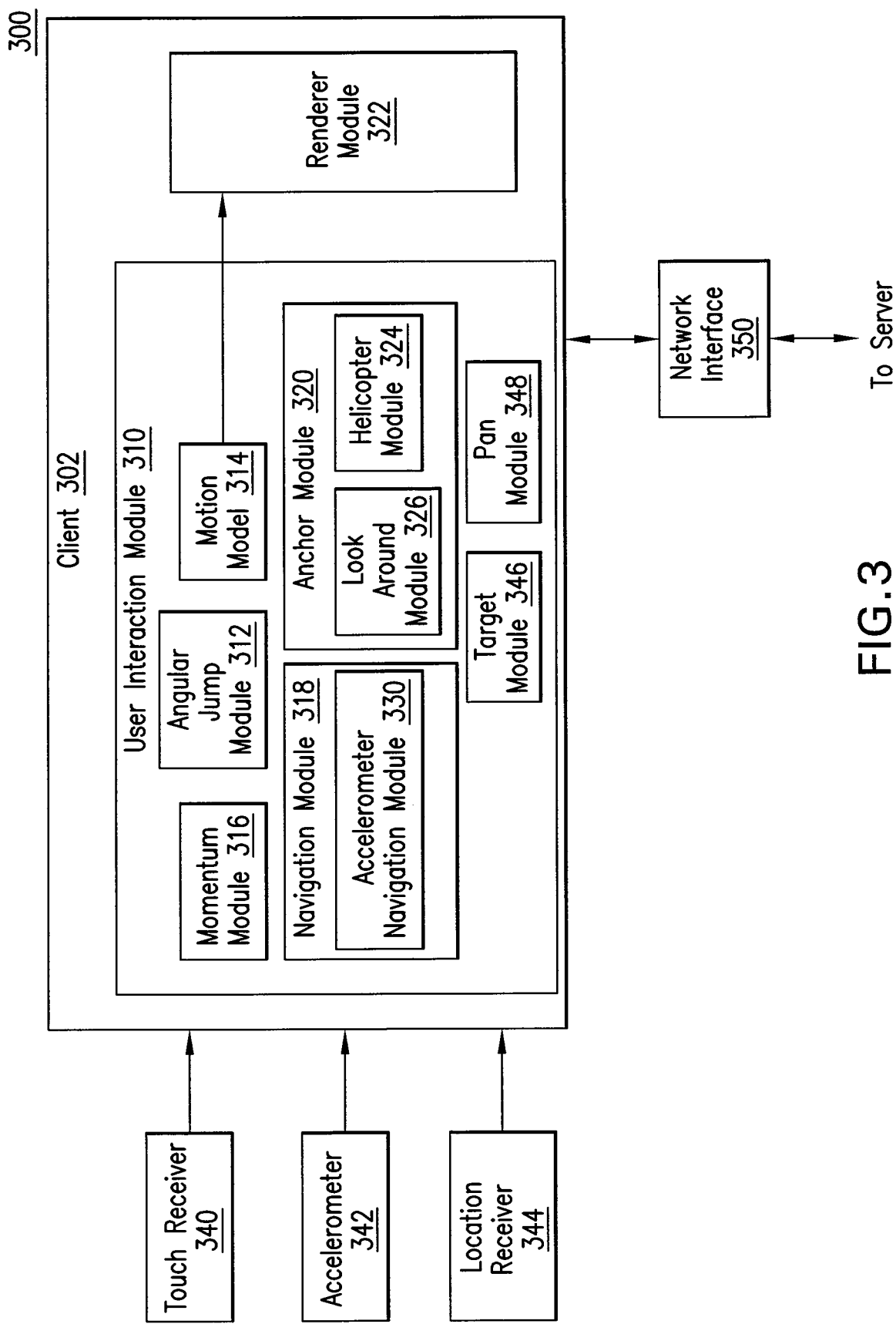
FIG. 3 is a diagram illustrating a system that accepts user interface gestures to navigate through a three dimensional environment.

This section describes a system that navigates a virtual camera through a three dimensional environment on a mobile device in response to user interface gestures. FIG. 3 is a diagram illustrating a system 300 that accepts user interface gestures for navigation in a three dimensional environment on a mobile device.

System 300 includes a client 302 having a user interaction module 310 and a renderer module 322. User interaction module 310 includes a motion model 314. In general, client 302 operates as follows. User interaction module 310 receives user input regarding a location that a user desires to view and, through motion model 314, constructs a view specification defining the virtual camera. Renderer module 322 uses the view specification to decide what data is to be drawn and draws the data. If renderer module 322 needs to draw data that system 300 does not have, system 300 sends a request to a server for the additional data across one or more networks, such as the Internet, using a network interface 350.

Motion model 314 constructs a view specification. The view specification defines the virtual camera's viewable volume within a three dimensional space, known as a frustum, and the position and orientation of the frustum in the three dimensional environment. In an embodiment, the frustum is in the shape of a truncated pyramid. The frustum has minimum and maximum view distances that can change depending on the viewing circumstances. Thus, changing the view specification changes the geographic data culled to the virtual camera's viewable volume. The culled geographic data is drawn by renderer module 322.

The view specification may specify three main parameter sets for the virtual camera: the camera tripod, the camera lens, and the camera focus capability. The camera tripod parameter set specifies the following: the virtual camera position (X, Y, Z coordinates); which way the virtual camera is oriented relative to a default orientation, such as heading angle (e.g., north?, south?, in-between?); pitch (e.g., level?, down?, up?, in-between?); yaw and roll (e.g., level?, clockwise?, anti-clockwise?, in-between?). The lens parameter set specifies the following: horizontal field of view (e.g., telephoto?, normal human eye—about 55 degrees?, or wide-angle?); and vertical field of view (e.g., telephoto?, normal human eye—about 55 degrees?, or wide-angle?). The focus parameter set specifies the following: distance to the near-clip plane (e.g., how close to the "lens" can the virtual camera see, where objects closer are not drawn); and distance to the far-clip plane (e.g., how far from the lens can the virtual camera see, where objects further are not drawn). As used herein "moving the virtual camera" includes zooming the virtual camera as well as translating the virtual camera.

To construct a view specification, user interaction module 310 receives user input. Client 302 has various mechanisms for receiving input. For example, client 302 may receive input using sensors including a touch receiver 340, an accelerometer 342, and a location module 344. Each of the sensors will now be described in turn.

Touch receiver 340 may be any type of touch receiver that accepts input from a touch screen. Touch receiver 340 may receive touch input on a view such as the view 102 in FIG. 1. The touch input received may include a position that the user touched as defined by an X and Y coordinate on the screen. The user may touch the screen with a finger, stylus, or other object. Touch receiver 340 may be able to receive multiple touches simultaneously if, for example, the user selects multiple locations on the screen. The screen may detect touches using any technology known in the art including, but not limited to, resistive, capacitive, infrared, surface acoustic wave, strain gauge, optical imaging, acoustic pulse recognition, frustrated total internal reflection, and diffused laser imaging technologies.

Accelerometer 342 may be any type of accelerometer as known to those skilled in the art. Accelerometer 342 may be able to detect when the mobile device moves. Accelerometer 342 also may be able to detect the orientation of a mobile device relative to gravity.

Location receiver 344 detects the location of the mobile device. Location receiver 344 may detect a location of a mobile device from, for example, a GPS receiver. A GPS receiver determines a location of the mobile device using signals from GPS satellites. In other examples, location receiver 344 may detect location of mobile device by, for example, collecting information from nearby cell towers and wi-fi hotspots. Location receiver 344 may use information from cell towers, wi-fi hotspots, and GPS satellites together to determine the location of the mobile device quickly and accurately.

As mentioned earlier, user interaction module 310 includes various modules that change the perspective of the virtual camera as defined by the view specification. User interaction module 310 includes a momentum module 316, an angular jump module 312, a navigation module 318, an anchor module 320, a pan module 348, and a target module 346. Each of these modules is described below.

The modules in user interaction module 310 may change a virtual camera's perspective according to a target location. A target location may be determined by a target module 346. In an embodiment, target module 346 may extend a ray from a focal point of the virtual camera. The target location may be an intersection of the ray with a three dimensional model, such as a three dimensional model of the Earth. The ray may be extended according to a position on the view selected by a user. Alternatively, the ray may be extended through a center of the view frustum of the virtual camera. The operation of target module 346 is described in more detail with respect to FIGS. 6A-B.

One module that uses target module 346 is angular jump module 312. In response to a user selecting a feature in the three dimensional environment, angular jump module 312 moves the virtual camera toward the feature. In an embodiment, touch receiver 340 receives a user input indicating that a user has selected a position of a view. In an example, a user may select a position on the view and initiate an angular jump by double tapping on the position. Based on the position selected by the user, target module 346 determines a target location. Using the target location, angular jump module 312 moves the virtual camera. Angular jump module 312 may move the virtual camera toward the target location and may rotate the virtual camera toward the target location. As the virtual camera moves, angular jump module 312 may change the virtual camera's roll to simulate an airplane banking. Angular jump module 312 may orient the virtual camera such that the target location appears approximately at the center of the view. To orient the virtual camera, angular jump module 312 may change pitch or yaw values of the virtual camera. In this way, a user can double tap on a screen with one hand and easily navigate the virtual camera towards the target. Further, the smooth transition of the virtual camera to its new location may create a pleasing effect to a user.

Anchor module 320 moves the virtual camera in response to other user interface gestures. In an embodiment, anchor module 320 is called when touch receiver 340 receives a two finger touch with one finger stationary and the other finger in motion. The relative initial positions of the stationary and moving fingers may activate one of two navigation modes—an anchored look-around mode or an anchored helicopter mode. In an embodiment, the anchored look-around mode is activated when the initial position of the first stationary finger is below the initial position of the second finger. The anchored helicopter mode is activated when the initial position of the first stationary finger is above the initial position of the second finger. The anchored look-around mode be executed by a look-around module 326, and the anchored helicopter mode may be executed by a helicopter module 324.

Look-around module 326 changes an orientation of the virtual camera according to movement of the second finger. Touch receiver 340 may receive the direction of the second finger's movement and send the direction to look-around module 326. Based on the direction, look-around module 326 may rotate the virtual camera along different axes. Look-around module 326 may change a yaw of the virtual camera when finger moves toward the left or right of the mobile device. Similarly, look-around module 326 may change a pitch of the virtual camera when the finger moves toward the top or bottom of the mobile device. The operation of look-around module 326 is described in more detail with respect to FIGS. 8 and 9A-B. In an embodiment, look-around module 326 also may change an orientation of the virtual camera in response to movement of two fingers. This embodiment is described with respect to FIG. 12.

Helicopter module 324 moves the virtual camera when the position of the stationary finger is initially below the moving finger. In an embodiment, when touch receiver 340 receives a two finger touch with the stationary finger below the moving finger, target module 346 may determine a target location. The target location may be determined by extending a ray based on the position of the stationary finger. Alternatively, the target location may be determined by extending a ray through a center of the virtual camera's view frustum. Determining a target location is described in more detail later with respect to FIGS. 6A-B.

Touch receiver 340 may send a direction of the moving finger to helicopter module 324. Based on the direction of the moving finger, helicopter module 324 may move the virtual camera in different directions, keeping a distance between the target location and the position of the virtual camera approximately constant. Helicopter module 324 may allow for small changes in the distance. For example, new terrain may be streamed into the client that causes the distance to change.

Helicopter module 324 may extend a ray upwards from the target location determined by target module 346. When the direction of the moving finger is towards the top or bottom of the mobile device, helicopter module 324 may change a tilt angle relative to the ray. Changing the tilt angle may move the virtual camera up or down. When the direction of the moving finger is towards the left or right of the mobile device, helicopter module 324 may change an azimuth angle relative to the ray. Changing an azimuth angle may move the virtual camera around the target location while maintaining a constant elevation. Further, when the direction of the moving finger has components on both axes of the mobile device, helicopter module 324 may change both the tilt and azimuth angles. In this way, helicopter module 324 enables a user to navigate easily around a target location. Helicopter module may also move the virtual camera when two fingers rotate on a screen of a mobile device as described for FIG. 16C.

In an embodiment, helicopter module 324 also may change a distance between the target location and the virtual camera. For example, the virtual camera may move into or away from the target location. For example, movement of the initially stationary finger may result in translating the virtual camera in towards or away from the target.

In an embodiment, helicopter module 324 may change an azimuth angle while allowing navigation module 318 to change a tilt angle based on an orientation of the mobile device relative to gravity. The operation of helicopter module 324 is described in more detail with respect to FIG. 10 and FIGS. 11A-B.

Navigation module 318 orients and positions the virtual camera in the three dimensional environment according to orientation and position information received from accelerometer 342 and location receiver 344. Navigation module 318 includes an accelerometer navigation module 330. In an embodiment, accelerometer 342 receives an orientation of the mobile device relative to gravity. Based on the orientation of the mobile device, accelerometer navigation module 330 changes a position or orientation of the virtual camera.

Based on the orientation of the mobile device, accelerometer navigation module 330 may change a pitch of the virtual camera, causing the virtual camera to look up and down. Alternatively, accelerometer navigation module 330 may change a tilt of the virtual camera relative to a target location, causing the virtual camera to move up or down.

Location receiver 344 may receive a heading value of the mobile device. For example, location receiver 344 may receive the cardinal direction (north, east, south, west) that the mobile device faces. Based on the heading value, navigation module 318 may orient the virtual camera in the direction of the mobile device. Also, location receiver 344 may receive a location value of the mobile device. For example, location receiver 344 may receive may receive a latitude, longitude and altitude of the mobile device. Based on the location of the mobile device, navigation module 318 may position a virtual camera in the three dimensional environment. The three dimensional environment may include a three dimensional model of the Earth. In this way, navigation module 318 may position and orient the virtual camera in the virtual Earth to correspond to the position and orientation of the mobile device in the real Earth. Navigation module 318 may continually update the position and orientation of the virtual camera to track the mobile device. The operation of navigation module 318 is described in more detail with respect to FIG. 13 and FIGS. 14A-B.

Each of angular jump module 312, momentum module 316, accelerometer navigation module 330, look-around module 326, and helicopter module 324 accept user interface gestures to move the virtual camera. Each of those modules may coordinate with momentum module 316 to continue the motion of the virtual camera after the user interface is gesture is complete. Momentum module 316 may gradually decelerate the motion after the gesture is complete. In this way, momentum module 316 simulates the virtual camera having a momentum and simulates the virtual camera being subjected to friction, such as air resistance.

As described above, anchor module 316 navigates a virtual camera when touch receiver 340 receives a two finger touch with one finger stationary and the other in motion. According to a further feature, when both fingers are in motion, momentum module 316 also may navigate the virtual camera. A two finger touch with both fingers in motion is sometimes described herein as a pinch gesture with the fingers either moving away from each other or towards each other. Momentum module 316 may determine a speed that the fingers relative to each other. Based on the finger speed, momentum module 316 may determine a speed of the virtual camera and may move the virtual camera at the determined speed. Moving the fingers towards each other may cause the virtual camera to move forward, whereas moving the fingers away from each other may cause the virtual camera to move backwards. Momentum module 316 may simulate air resistance and consequently may reduce the speed of the virtual camera gradually.

Alternatively, the virtual camera may remain stationary and a three dimensional model, such as a three dimensional model of the Earth, may move according to the finger speed. Momentum module 316 may rotate a model of the Earth at an angular velocity determined according to a finger speed. The operation of momentum module 316 is described in more detail with respect to FIG. 15 and FIG. 16A-B.

A three dimensional model, such as a three dimensional model of the Earth, may also be rotated by pan module 348. In an embodiment, touch receiver 340 may receive a user input indicating that a user has touched a first position on a view of the mobile device and moved his finger to a second position on the view (a touch-and-drag gesture). Based on the first and second positions, target module 346 may determine first and second points in the three dimensional environment. Based on the first and second points, pan module 348 may move the three dimensional model relative to the virtual camera. This movement may be referred to herein as "panning." In an example, pan module 348 may move the three dimensional model by determining a rotation axis on the three dimensional model and rotating the three dimensional model around the rotation axis.

In an embodiment, the operation of pan module 348 may change according to the orientation of the virtual camera. As mentioned earlier, the orientation of the virtual camera may be determined according to an orientation of the mobile device relative to gravity. In an example, when the virtual camera faces the ground, the user may pan in any direction. However, when the virtual camera faces the horizon, the user may pan only forward and backwards. Finger movements to the left and right instead may result in the virtual camera looking to the left or right. The operation of pan module 348 is described in greater detail with respect to FIG. 17, FIGS. 18A-B, and FIGS. 19A-C.

Each of the components of system 300 may be implemented in hardware, software, firmware, or any combination thereof.

In the following sections, the operation of angular jump module 312, target module 346, anchor module 320, momentum module 316, navigation module 318 and pan module 348 is described in greater detail.

Angular Jump

This section describes a method for angular jump navigation with respect to FIGS. 4-5, 6A-B, and 7. Angular jump navigation enables a user to navigate easily and intuitively in a three dimensional environment on a mobile device. In general, in response to a user double tapping on a location, the method navigates a virtual camera toward a location and angles the virtual camera toward the location.

Figure 4:
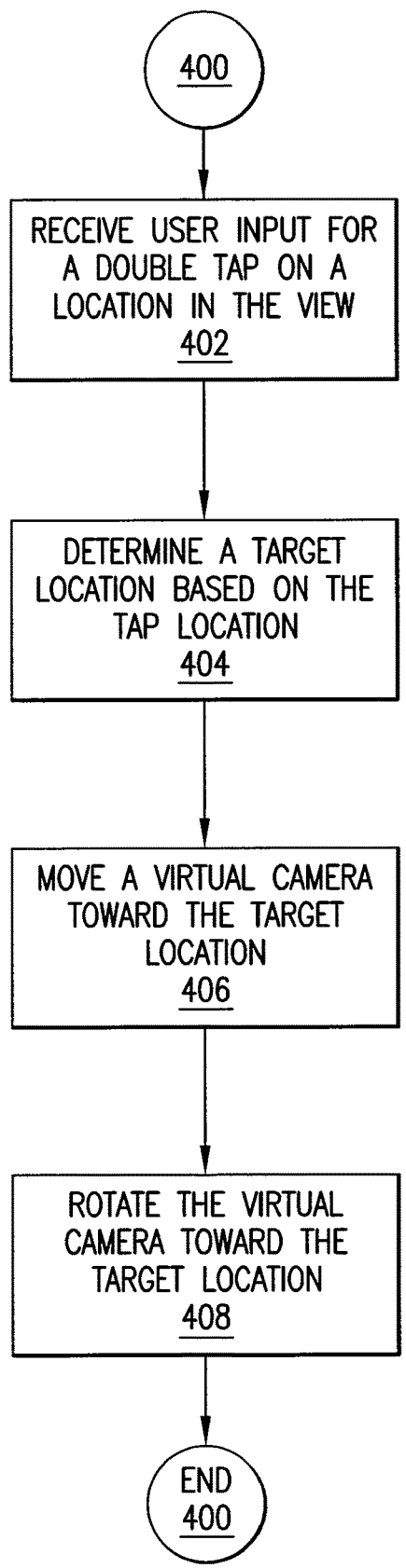
FIG. 4 is a flowchart illustrating a method for angular jump navigation.
Figure 5:
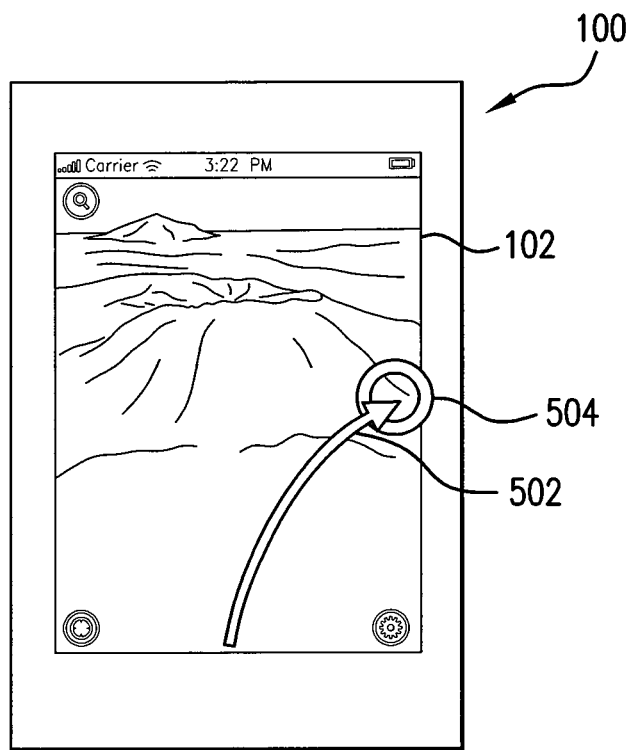
FIG. 5 is a diagram illustrating angular jump navigation on a mobile device.

FIG. 4 is a flowchart illustrating a method 400 for angular jump navigation. Method 400 begins with receiving a user input indicating that a user has double tapped on a location of a view at step 402. Step 402 is illustrated in FIG. 5. FIG. 5 shows a diagram 500 illustrating angular jump navigation on a mobile device. Diagram 500 shows mobile device 100 with view 102. A user double taps at a location 504. Angular jump navigation navigates along a trajectory 502 as is described in the remaining steps of method 400.

Figure 6A:
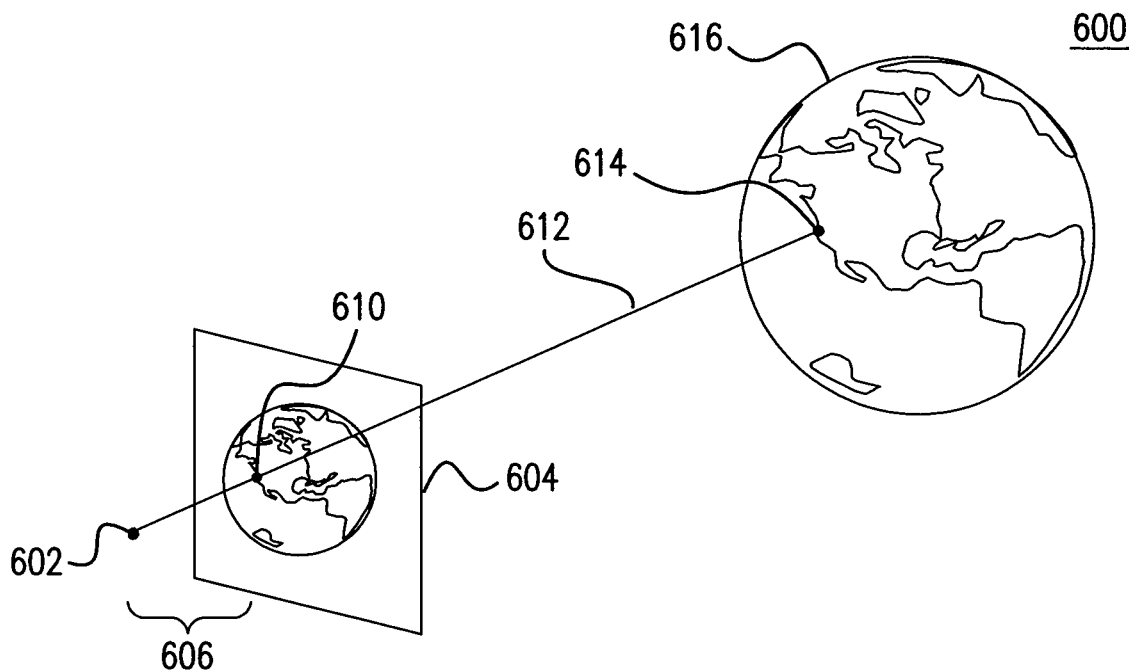
FIGS. 6A-B are diagrams illustrating determining a target location according to a position selected on a view.
Figure 6B:
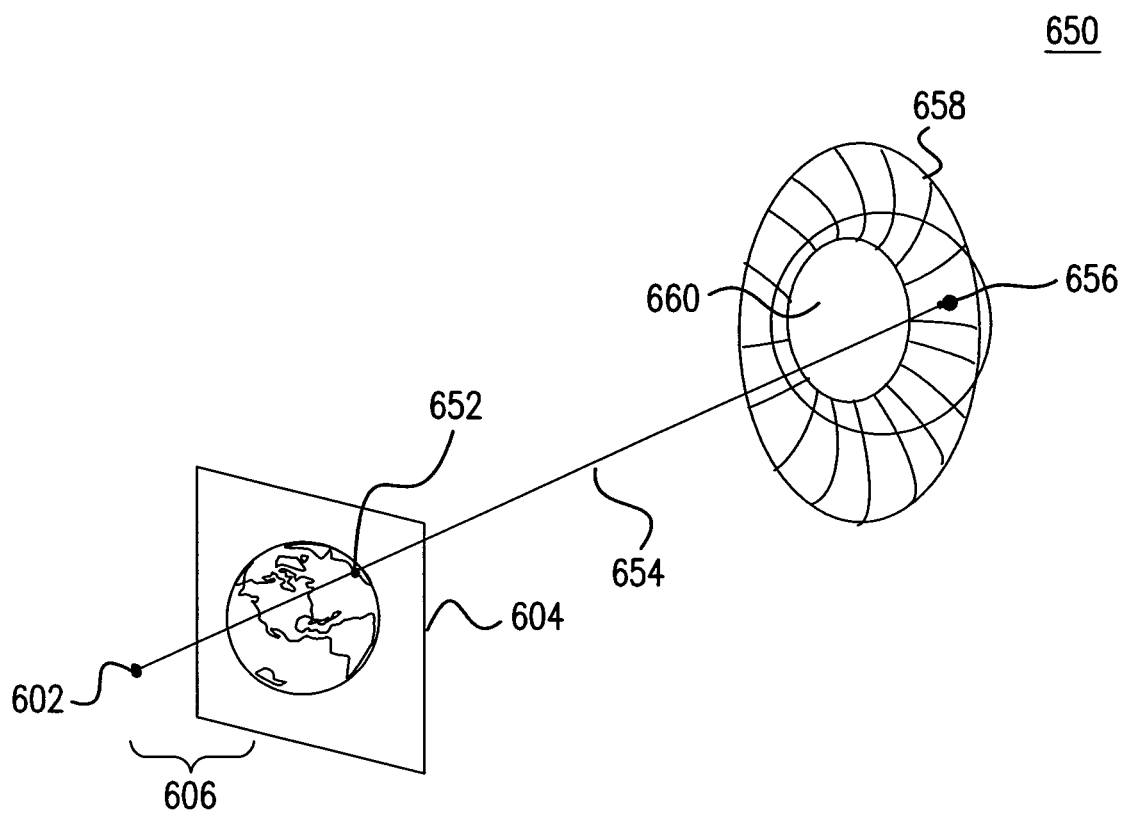

Based on a location of the tap location received in step 402, a target location is determined at step 404. Determining a target location is illustrated in FIGS. 6A-B. FIG. 6A shows a diagram 600 illustrating extending a screen ray to determine a target location. Diagram 600 shows a virtual camera with a focal point 602. The virtual camera has a focal length 606 and a viewport 604. On viewport 604, point 610 corresponds to a point selected by a user on a view of the mobile device. From focal point 602, a ray 612 is extended through point 610. Ray 612 intersects with a three dimensional model 616 to determine a target location 614. In this way, target location 614 is determined based on the point selected (e.g., double tapped) by the user.

While being easy for user, double tapping a view with a finger can be imprecise. Mobile devices tend to have small views (handheld mobile devices, for example, may have views generally not larger than 4 inches). As a result, a finger touch may occupy a substantial portion of the view. When the user selects a position that is close to the horizon, the screen ray may be nearly tangential to the three dimensional model. Small changes in the position of the wide finger may result in large changes in the target location. As result, angular jump navigation may be unstable.

To deal with potential instability, the user selection may be damped as illustrated in FIG. 6B. FIG. 6B shows a diagram 650 with a virtual camera having focal point 602, focal length 606 and viewport 604. A user selects a point on the view close to a horizon. The point selected by the user corresponds to a point 652 on viewport 604. A ray 654 extends from focal point 602 through point 652 on viewport 604. Ray 654 intersects with a concave virtual surface 658 at a point 656. Point 656 may be projected onto three dimensional model 660 to determine a target location. By intersecting a screen ray with a virtual surface, the user's selection is damped, thus improving stability. Diagram 650 shows one method for damping a user selection, but other methods may be used as are known to those of skill in the art.

Referring back to FIG. 4, once a target location is determined, the virtual camera moves toward the target location at step 406. As the virtual camera moves toward the target location, the virtual camera rotates toward the target location at step 408. Steps 406 and 408 are illustrated in FIG. 7.

Figure 7:
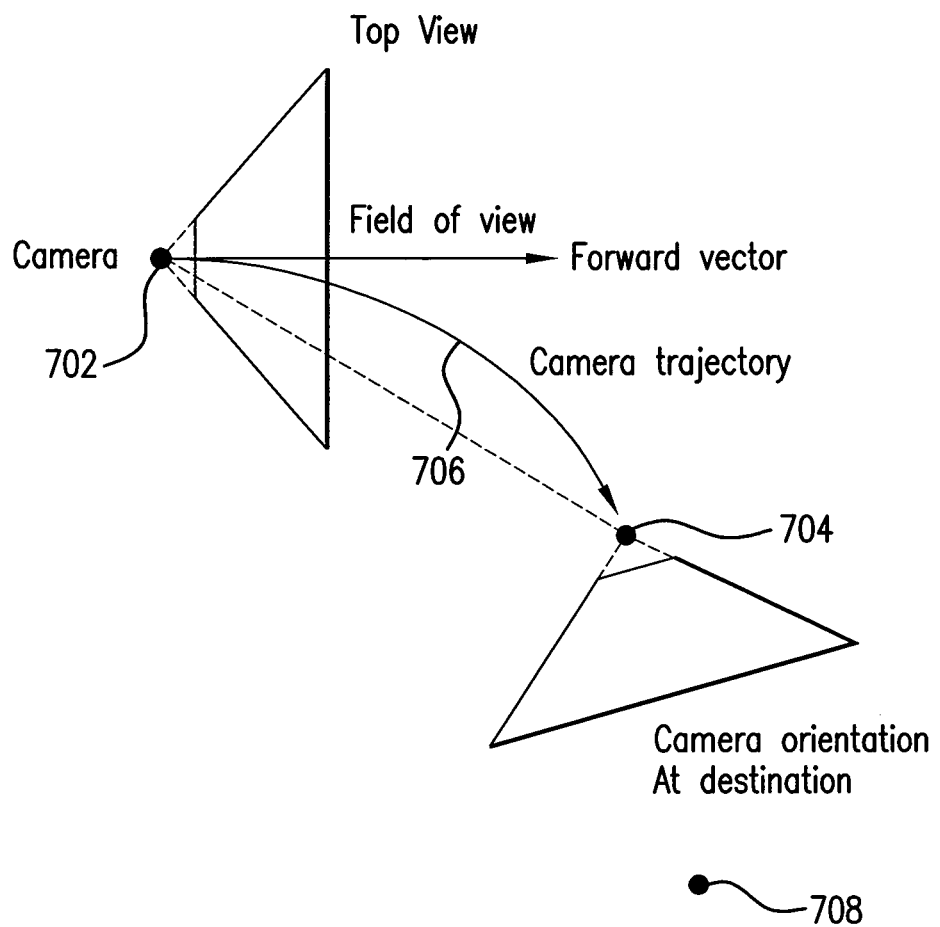
FIG. 7 is a diagram illustrating an angular jump trajectory.

FIG. 7 shows a diagram 700 illustrating an angular jump trajectory. Diagram 700 shows a virtual camera at an initial position 702. The virtual camera moves along a trajectory 706. The virtual camera may start with an initial forward velocity vector. As the virtual camera continues on trajectory 706, the virtual camera rotates towards a target 708. Rotating towards a target 708 may include changing a pitch or yaw of the virtual camera. As the virtual camera continues on trajectory 706, the virtual camera may slow down, coming to rest at a position 704 facing the target 708. When the virtual camera comes to rest, the target 708 may appear at approximately the center of the view. The approximate center of the view may not be the exact center as small offsets from the center are allowed.

As the virtual camera moves along trajectory 706, the virtual camera may roll. The roll may simulate an aircraft-like turn toward the destination. The virtual camera may start trajectory 706 with no roll. The virtual camera's roll may increase as it moves along trajectory 706 and may attain the largest amount of roll midway through trajectory 706. Then, the virtual camera's roll may decrease returning to zero roll when the virtual camera reaches its final position 704.

In this way, angular jump navigation enables a user to easily navigate towards a target location in a three dimensional environment. Additionally, by determining the target location based on a double touch gesture, the user can navigate towards the location with only one hand. This is useful because often users have one hand holding the mobile device, leaving only one hand free to navigate in the three dimensional environment.

Anchored Navigation

With one free hand to navigate, several user interface gestures may use two fingers. This section describes two user interface gestures using two fingers—anchored look-around and anchored helicopter. Each user interface gesture has one finger initially stationary with the other moving. The stationary finger may touch the screen before the moving finger. The initial relative position of the stationary and moving fingers may determine whether the user enters an anchored look-around navigation mode or an anchored helicopter navigation mode.

Figure 8:
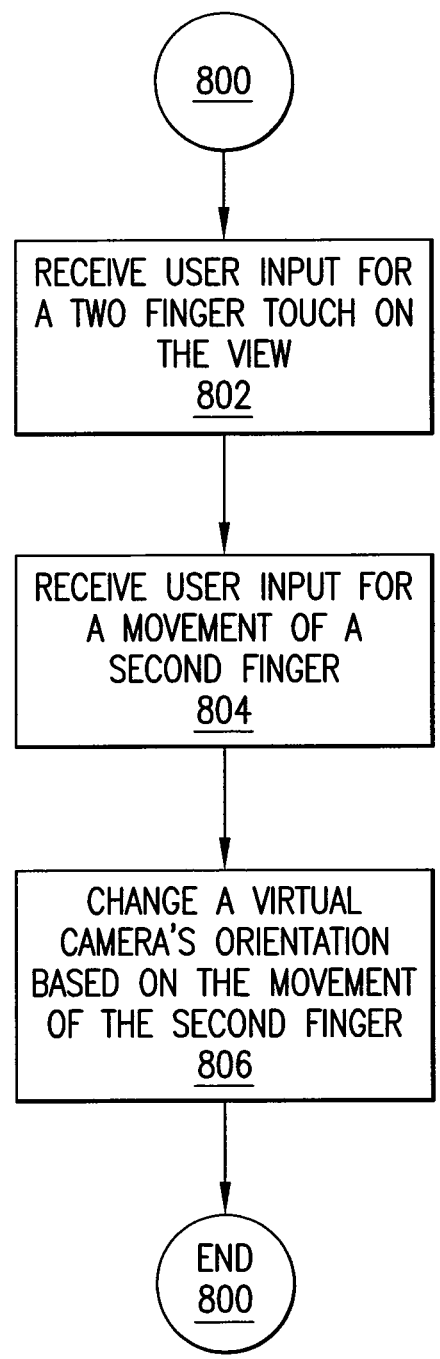
FIG. 8 is a flowchart illustrating a method for anchored look-around navigation.

FIG. 8 is a flowchart illustrating a method 800 for anchored look-around navigation. Method 800 begins by receiving a user input for a two finger touch on a view of the mobile device at step 802. One of the two fingers is in motion and the direction of motion (e.g. a motion vector) of the second finger is received at step 804. The two finger touch is illustrated in FIG. 9A.

Figure 9A:
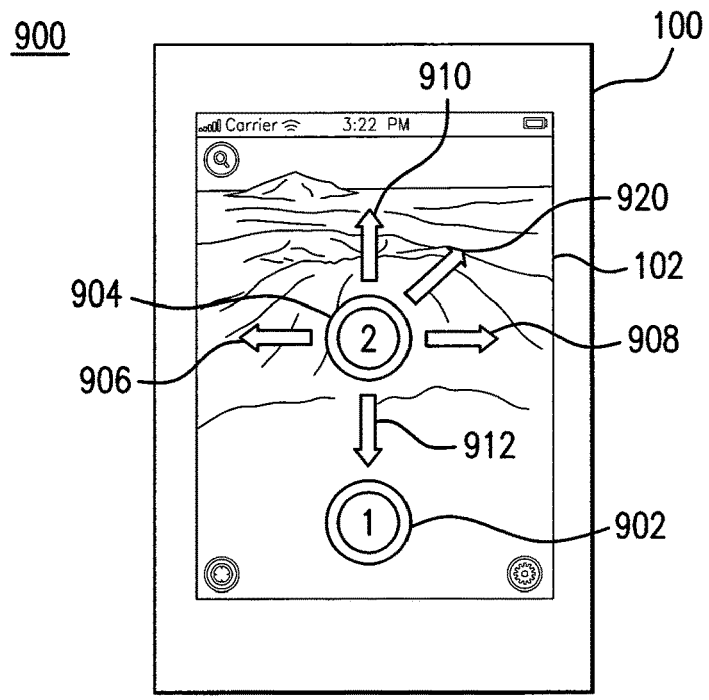
FIGS. 9A-B are diagrams illustrating anchored look-around navigation on a mobile device.

FIG. 9A shows a diagram 900. Diagram 900 shows mobile device 100 with view 102. A user has touched view 102 with a finger 902 and a finger 904. Finger 902 is initially stationary and finger 904 is initially in motion. Finger 902 may touch the screen at least a certain amount time before finger 904. As result of the relative position of finger 902 and 904, the user enters an anchored look-around navigation mode. In an embodiment, the user enters anchored navigation mode when the finger initially moving (finger 904) is above the finger that is initially stationary (finger 902).

Referring back to FIG. 8, once the movement of the second finger is received, an orientation of the virtual camera is changed according to the movement of the second finger. How the virtual camera's orientation is changed is illustrated in FIG. 9B.

Figure 9B:
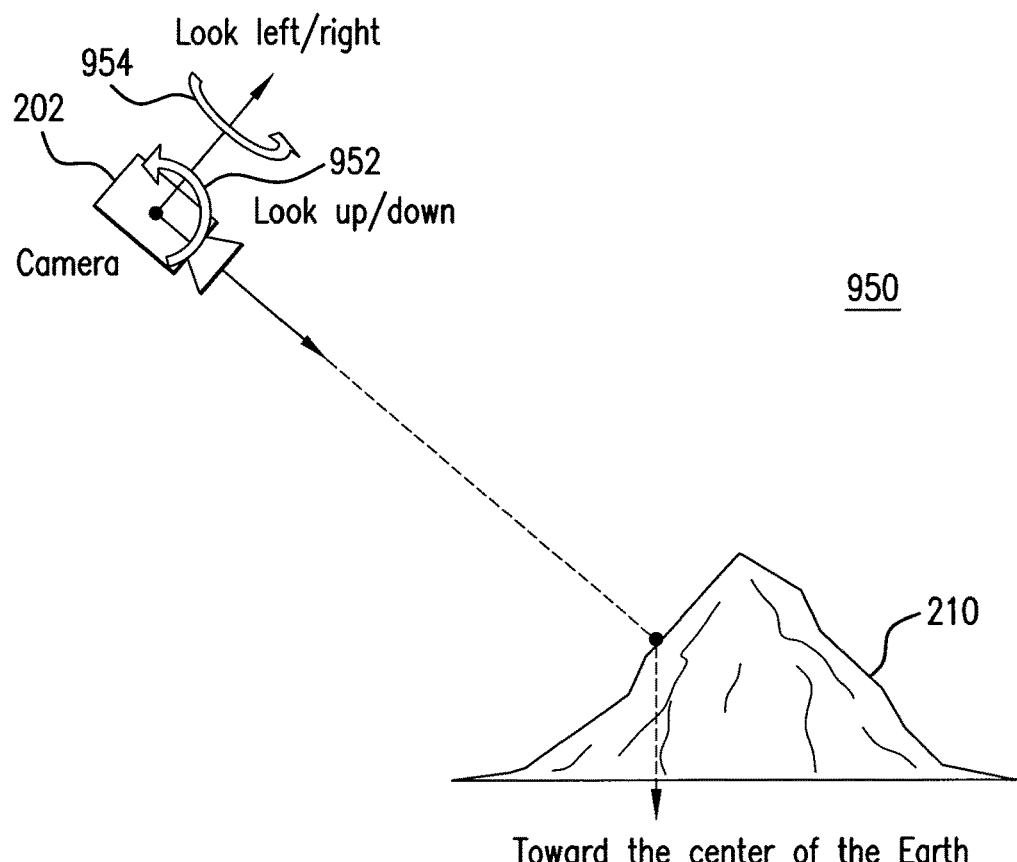

FIG. 9B shows a diagram 950 illustrating a virtual camera looking around in a three dimensional environment. Diagram 950 shows three dimensional terrain 210 and virtual camera 202. By changing its pitch, camera 202 may look up and down as show by an arrow 952. By changing its yaw, camera 202 may look left and right as show by an arrow 954.

In FIG. 9A, when a user moves finger 904 to the left or right, as shown by arrows 906 and 908, the virtual camera's yaw may change to look left or right accordingly. Similarly, when a user moves finger 904 up or down, as shown by arrows 906 and 908, the virtual camera's pitch may change to look up or down accordingly. When a user moves his finger at a diagonal, as shown by arrow 920, both a pitch and a yaw of the virtual camera may change. The pitch and yaw may change according to the components of the motion vector along the axes of the mobile device. In this way, by moving a finger, a user can cause the virtual camera to look-around, viewing the three dimensional environment from different perspectives.

In an alternative embodiment, the virtual camera may look to the left and right based on the user input, while looking up and down based on an orientation of a mobile device. An orientation of the mobile device relative to gravity may be received from an accelerometer of the mobile device. A pitch of the virtual camera may be changed according to the orientation of the mobile device. In this way, the user can look up and down by angling the mobile device up and down.

In an embodiment, an axis of the virtual camera may be determined based on the position of the first, stationary finger. In an example, a target location may be determined based on the position of the stationary finger. The axis is the line connecting the virtual camera and the target location. In this embodiment, movement of the second finger causes the virtual camera to rotate about the axis.

As mentioned earlier, a user enters an anchored look-around mode when the stationary finger is below the moving finger. However, when the stationary finger is above the moving finger, the user may enter an anchored helicopter mode. Anchored helicopter mode is described with respect to FIGS. 10 and 11A-B.

Figure 10:
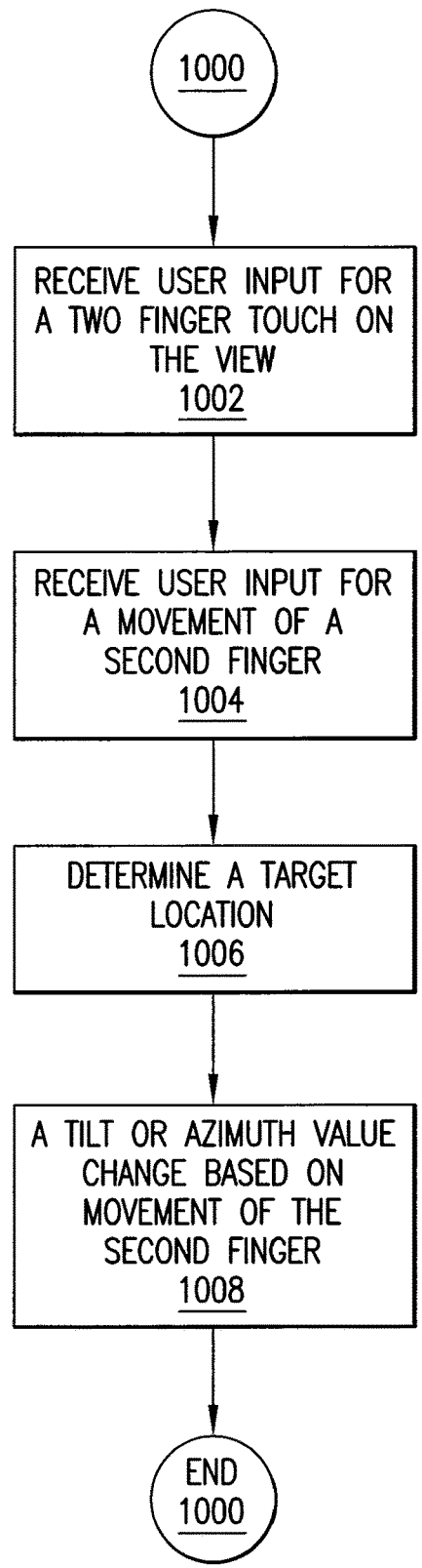
FIG. 10 is a flowchart illustrating a method for anchored helicopter navigation.

FIG. 10 is a flowchart illustrating a method 1000 for anchored helicopter navigation. Method 1000 begins by receiving a user input for a two finger touch on a view of the mobile device at step 1002. One of the two fingers is in motion and the direction of motion (e.g. a motion vector) of the second finger is received at step 1004. The two finger touch is illustrated in FIG. 11A.

Figure 11A:
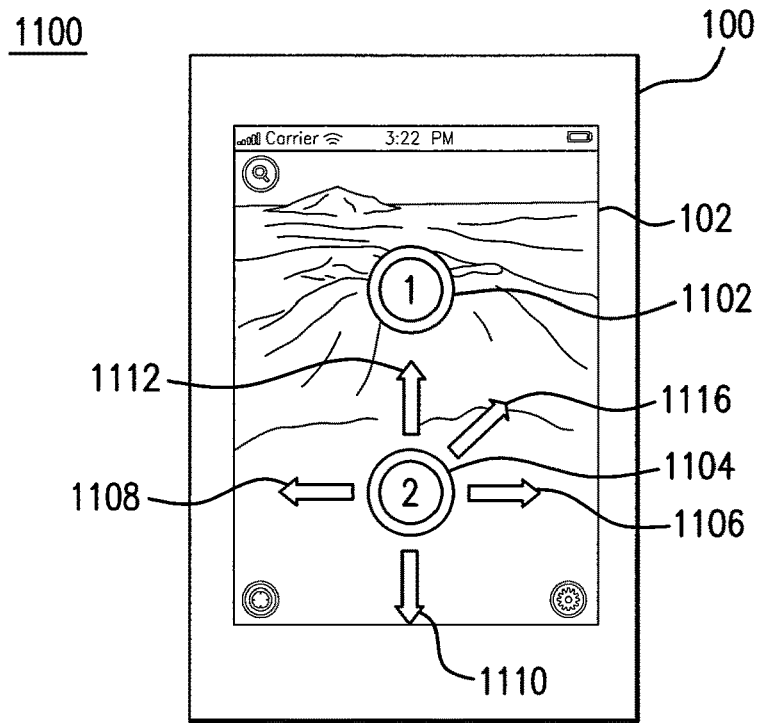
FIGS. 11A-B are diagrams illustrating anchored helicopter navigation on a mobile device.

FIG. 11A shows a diagram 1100. Diagram 1100 shows mobile device 100 with view 102. A user has touched view 102 with a finger 1102 and a finger 1104. Finger 1102 is initially stationary and finger 1104 is initially in motion. A user may touch view 102 with a finger 1102 a certain time prior to touching the view with a finger 1104. As result of the relative position of finger 1102 and 1104, the user enters an anchored helicopter mode. As mentioned above, the user may enter anchored helicopter mode when the finger initially moving (finger 1104) is below the finger that is initially stationary (finger 1102).

Referring back to FIG. 10, after receiving user input, a target location is determined at step 1004. In an embodiment, the target location may be determined based on the position of the first, stationary finger. The target location may be determined by extending a screen ray as described in FIG. 6A. Further, the screen ray may be damped as described with respect to FIG. 6B. Alternatively, the target location may be determined by extending a ray through a center of the virtual camera's view frustum. The ray may intersect with a three dimensional model at a target location. These examples are illustrative, and other methods of determining a target location may be used as are known to those of skill in the art.

Once a target location is determined, a tilt or azimuth value relative to the target location is changed according to the movement of the second finger at step 1008. Step 1008 is illustrated in FIG. 11B.

Figure 11B:
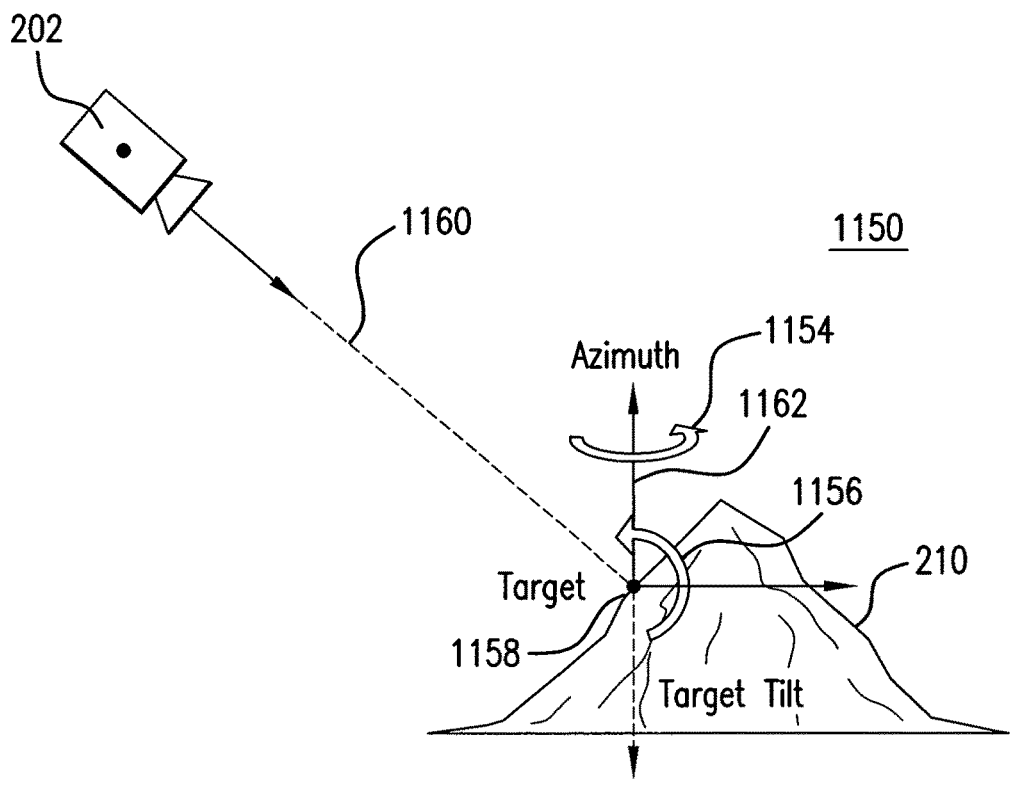

FIG. 11B shows a diagram 1150 illustrating anchored helicopter navigation. Diagram 1150 shows virtual camera 202 directed towards three dimensional terrain 210. A ray 1160 is extended to determine a target 1158 as described for step 1006. From target 1158, a vector 1162 directed upwards is determined. Relative to vector 1162, virtual camera 202 has a tilt angle 1156 and an azimuth angle 1154. Changing tilt angle 1156 causes virtual camera 202 to move up or down, and changing azimuth angle 1154 causes virtual camera 202 to orbit around target 1158 at a constant elevation. In an embodiment, changing tilt angle 1156 and azimuth angle 1154 does not change the distance between virtual camera 202 and target 1158. In this way, changing tilt angle 1156 and azimuth angle 1154 navigates the virtual camera around target 1158 while staying equidistant to target 1158.

In FIG. 11A, when a user moves finger 1104 left or right, as shown by arrows 1108 and 1106, an azimuth angle changes causing virtual camera 202 to orbit around the target 1158 at a constant elevation. Similarly, when a user moves finger 904 up or down, as shown by arrows 1110 and 1112, a tilt angle may change moving the virtual camera up and down relative to target 1158. When a user moves his finger at a diagonal, as shown by arrow 1116, both the tilt and azimuth angles may change. The tilt and azimuth values may change according the components of the motion vector along the axes of the mobile device. In this way, by moving a finger, a user can cause the virtual camera to move around a target location, viewing a target location from different perspectives. An orientation of the virtual camera may also change such that the virtual camera continues to face the target.

In an example, a user may move finger 1104 down and to the right. In this example, both a tilt and azimuth value relative to a target location may increase in response to the finger movement. As the tilt value increases the virtual camera moves down towards the elevation of the target location. Meanwhile, the increasing azimuth value causes the virtual camera to rotate around the target location. While the virtual camera is moving, the virtual camera may remain oriented toward the target location. In this way, a user can easily view a feature in the three dimensional environment from different perspectives.

In an embodiment, the distance between the virtual camera and the target location may also change. For example, the virtual camera may swoop into the target by moving the virtual camera into a target while changing a tilt or azimuth value. Also, the virtual camera can move away from the target while changing a tilt or azimuth value.

In an embodiment, moving finger 1104 left or right may change an azimuth angle, while a tilt angle is determined according to an orientation of the mobile device. An orientation of the mobile device relative to gravity may be received from an accelerometer of the mobile device. Based on the orientation of the mobile device, the tilt angle is determined. In this way, the user may move the virtual camera up and down by moving the mobile device up and down.

For instance, a user holding the mobile device and viewing a display may move the device relative to the ground. As the device moves to face the ground, the virtual camera may move above the target and face down toward the target. As the device moves to perpendicular to the ground, the virtual camera may move to the target's elevation and view the target from aground-level view.

Dual Finger Look-Around Navigation

As mentioned earlier, a user may cause a virtual camera to look around by moving one finger and keeping another stationary. This section describes another gesture that may cause a virtual camera to look around. The gesture described in this section includes two fingers touching the display. In general, two fingers move in approximately the same direction by approximately the same distance and the virtual camera moves according to the finger movement.

Figure 12:
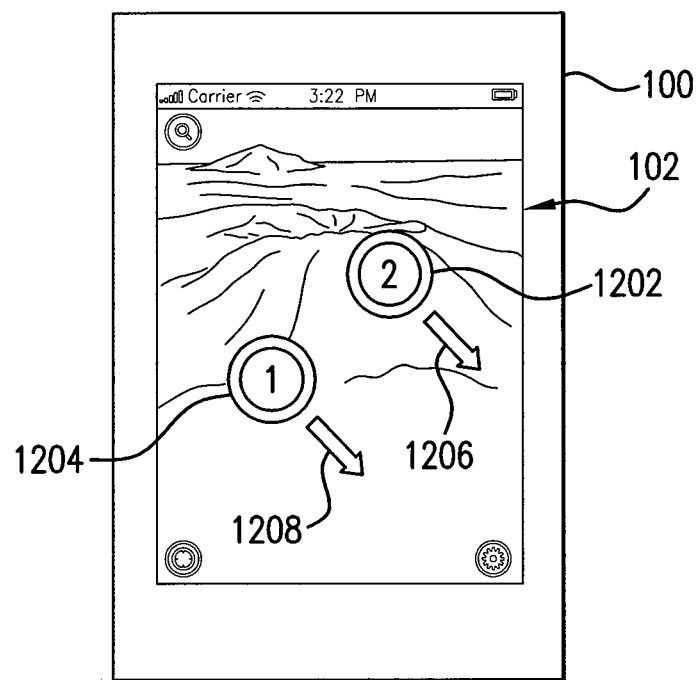
FIG. 12 is a diagram illustrating a two finger gesture for looking around in a three dimensional environment on a mobile device.

FIG. 12 shows a diagram 1200 illustrating a two finger gesture for looking around in a three dimensional environment on a mobile device. Diagram 1200 shows mobile device 100 with view 102. Touching view 102 are fingers 1202 and 1204. With the user touching view 102, user moves fingers 1202 and 1204 on view 102 as shown by vectors 1206 and 1208. Vectors 1206 and 1208 represent the direction and distance that a user moves fingers 1202 and 1204.

Vectors 1206 and 1208 may be in approximately the same direction. Vectors 1206 and 1208 need not be exactly parallel. A small angle between directions 1206 and 1208 may be allowed up to a threshold. Similarly, vectors 1206 and 1208 may have approximately the same length. A small difference in the length of vectors 1206 and 1208 may be allowed up to a threshold.

Based on the direction and distance that the user moves fingers 1202 and 1204, a virtual camera's orientation changes. Fingers 1202 and 1204 have moved slightly different directions and distances then the direction and distance values may be combined to determine an aggregate vector. In an example, the direction and distance values of vectors 1206 and 1208 may be averaged to determine the aggregate vector. Here a vector is described but any type of motion data may be used.

In response to movement of fingers 1202 and 1204, the virtual camera may change its orientation as illustrated in FIG. 9B. FIG. 9B shows a diagram 950 with three dimensional terrain 210 and virtual camera 202. Diagram 950 shows three dimensional terrain 210 and virtual camera 202. When the vector of finger movement is to the left or right on the mobile device, the virtual camera's yaw may change. Changing the virtual camera's yaw causes the camera to look left or right as show by arrow 954. Similarly, when the vector of finger movement is up or down on the mobile device, the virtual camera's pitch may change. Changing the virtual camera's pitch causes the camera to look to up or down as shown by arrow 956.

When a user moves his finger at a diagonal, both a pitch and a yaw of the virtual camera may change. The pitch and yaw may change according to the components of the vector of the finger movement along the axes of the mobile device. In this way, by moving two fingers, a user can cause the virtual camera to look-around, viewing the three dimensional environment from different perspectives.

In an alternative embodiment, the virtual camera may look to the left and right based on the user input, while looking up and down based on an orientation of a mobile device. An orientation of the mobile device relative to gravity may be received from an accelerometer of the mobile device. A pitch of the virtual camera may be changed according to the orientation of the mobile device. In this way, the user can look up and down by angling the mobile device up and down. The orientation of the mobile device may be determined by an accelerometer. The next section describes accelerometer navigation in greater detail.

Accelerometer Navigation

Figure 13:
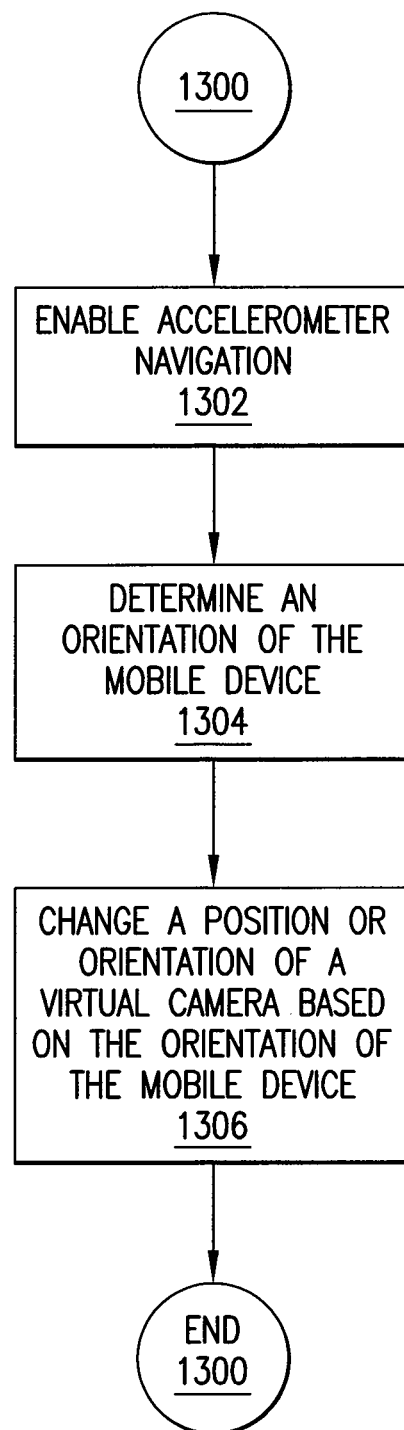
FIG. 13 is a flowchart illustrating a method for navigating a virtual camera based on an orientation of a mobile device.

This section describes navigating a virtual camera with an accelerometer in greater detail. FIG. 13 is a flowchart illustrating a method 1300 for navigating a virtual camera based on an orientation of a mobile device.

Method 1300 begins with enabling accelerometer navigation at step 1302. Accelerometer navigation may be enabled, for example, when a user makes a setting change to turn it on or at startup if a default setting is set for accelerometer navigation. In another example, entering a navigation mode such as anchored navigation or look-around navigation may enable accelerometer navigation. Also, accelerometer navigation may be enabled when a change in orientation of the mobile device exceeds a threshold. This way minor changes in orientation do not unintentionally change the perspective of the virtual camera. Also, the accelerometer navigation may be enabled when an orientation of the mobile device relative to gravity exceeds a threshold. If an orientation of the mobile device relative to gravity is below a threshold, the orientation may be in a "dead zone".

Figure 14A:
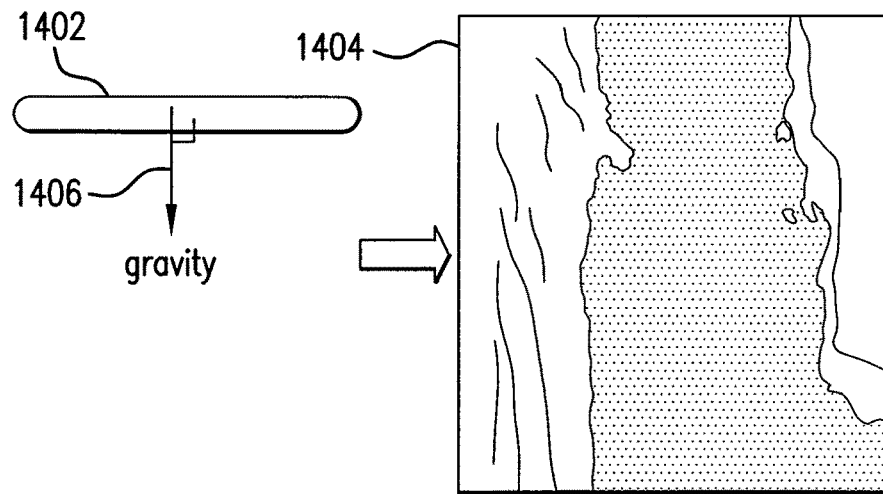
FIGS. 14A-C are diagrams illustrating navigating a virtual camera based on an orientation of a mobile device.
Figure 14B:
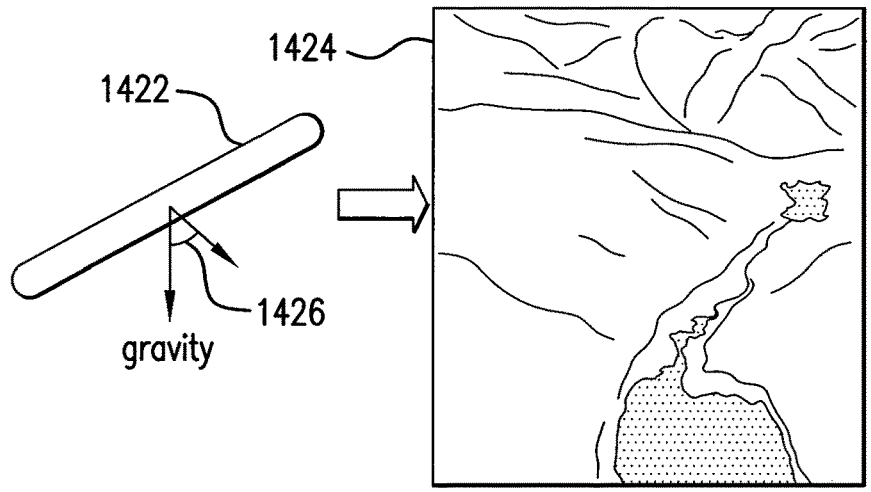
Figure 14C:
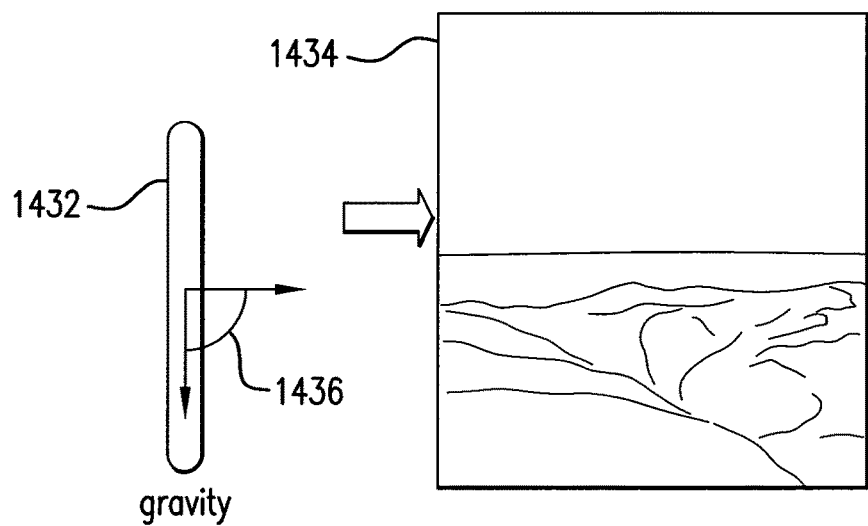

Once accelerometer navigation is enabled, an orientation of the mobile device is determined at step 1304. In an embodiment, an accelerometer determines the direction of gravity and an orientation of the mobile device relative to gravity. Based on the orientation of the mobile device, the virtual camera's position or orientation is changed at step 1306. Steps 1304 and 1306 are illustrated in FIGS. 14A-C. Further, the accelerometer readings may be damped.

FIGS. 14A-C each show a mobile device with a different orientation. FIG. 14A shows a profile of a mobile device 1402 facing the ground. Suppose that an orientation of mobile device 1402 is defined relative to a vector normal to the plane of the screen of mobile device 1402. An accelerometer of the mobile device detects that gravity is facing straight down. In other words, gravity is parallel to the orientation of mobile device 1402. As result, the virtual camera is oriented straight down at a three dimensional model, such as a three dimensional model of the Earth. With the virtual camera facing the ground, the virtual camera may capture an image 1404 of the ground.

FIG. 14B shows a profile of a mobile device 1422 at an angle relative to the ground. An accelerometer of the mobile device detects that gravity has an angle 1426 relative to the orientation of the mobile device. As result, the virtual camera's pitch may be set to angle 1426. Orienting the virtual camera at angle 1426, an image captured by the virtual camera and displayed to the user may appear as an image 1424.

Alternatively, the virtual camera's pitch may be determined based on angle 1426. In an embodiment, a range of angles of the mobile device may interpolate smoothly to a range of angles of the virtual camera. The interpolation may be a linear interpolation. In an example, suppose the range of angles of the mobile device is 30 degrees to 90 degrees. That range interpolate to a range of angles of the virtual camera of 0 degrees to 90 degrees. In that example, if a user holds the device at 60 degrees, an angle of the virtual camera may be set to 45 degrees. This example is merely illustrative.

FIG. 14C shows a profile of a mobile device 1432 normal to the ground. An accelerometer of the mobile device detects that gravity has an angle 1436 relative to the mobile device. As result, the virtual camera's pitch may be set to angle 1436. Orienting the virtual camera at angle 1436, an image captured by the virtual camera and displayed to the user may appear as an image 1434 facing the horizon.

As illustrated in FIGS. 14A-C, as the user changes an orientation of the mobile device, an orientation of the virtual camera changes. Thus, as the user directs the mobile device toward the horizon, the virtual camera looks toward the horizon. As the user directs the mobile device towards the sky, the virtual camera looks toward the sky. Finally, as the user directs the mobile device towards the ground, the virtual camera looks toward the ground.

In addition to changing an orientation of the virtual camera, a position of the virtual camera may also change according to an orientation of a mobile device. In an embodiment, a target location and a tilt angle may be determined as described with respect to FIGS. 11A-B. As the orientation of the mobile device changes, a tilt angle of the virtual camera relative to a target location may change.

In this way, a user can navigate through a three dimensional environment by changing an orientation of a mobile device.

Pinch Momentum

The anchored navigation section discussed a two finger gesture with one finger initially stationary and the other initially in motion. This section describes a two finger gesture with both fingers initially in motion. The two finger gesture may be referred to as a pinch and is described with respect to FIG. 15 and FIGS. 16A-B. A pinch also may be distinguished from anchored navigation by the timing of the first and second finger touches. For example, when a time between first and second fingers is above a threshold, an anchored navigation mode may be activated. When a time between first and second fingers is above a threshold, the virtual camera may be moved with a pinch momentum. In an alternative embodiment, the anchored navigation mode may be activated when the time is below a threshold, and the virtual camera may be moved with a pinch momentum when the time is above a threshold.

Figure 15:
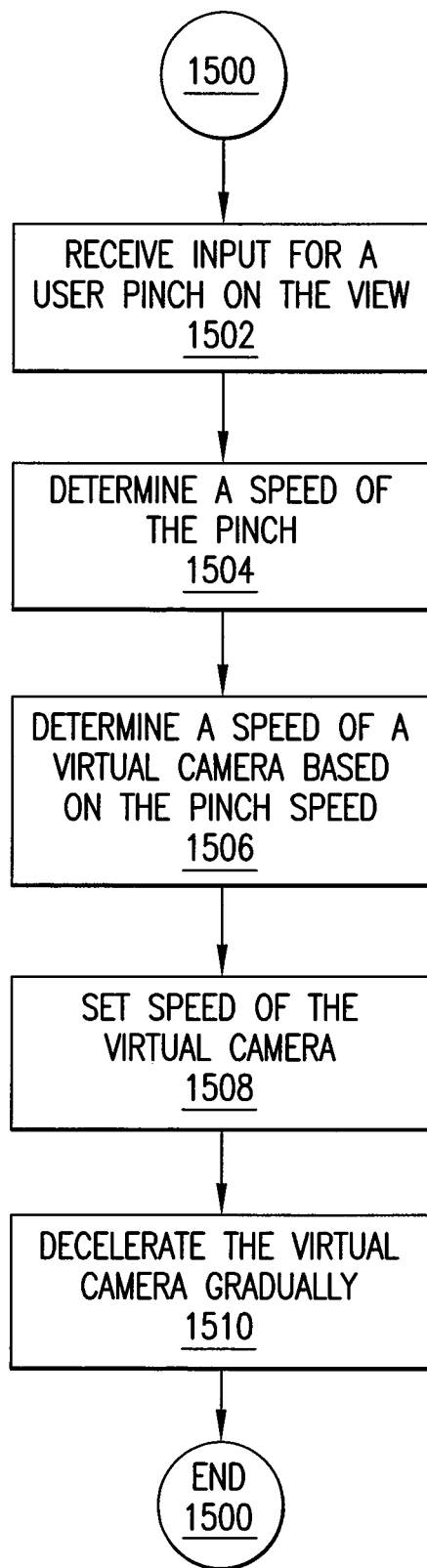
FIG. 15 is a flowchart illustrating a method for navigating a virtual camera using a pinch momentum.

FIG. 15 is a flowchart illustrating a method 1500 for navigating a virtual camera using a pinch. Method 1500 begins by receiving an input for a user pinch on the view at 1502. A user pinch is described is illustrated in FIG. 16A.

Figure 16A:
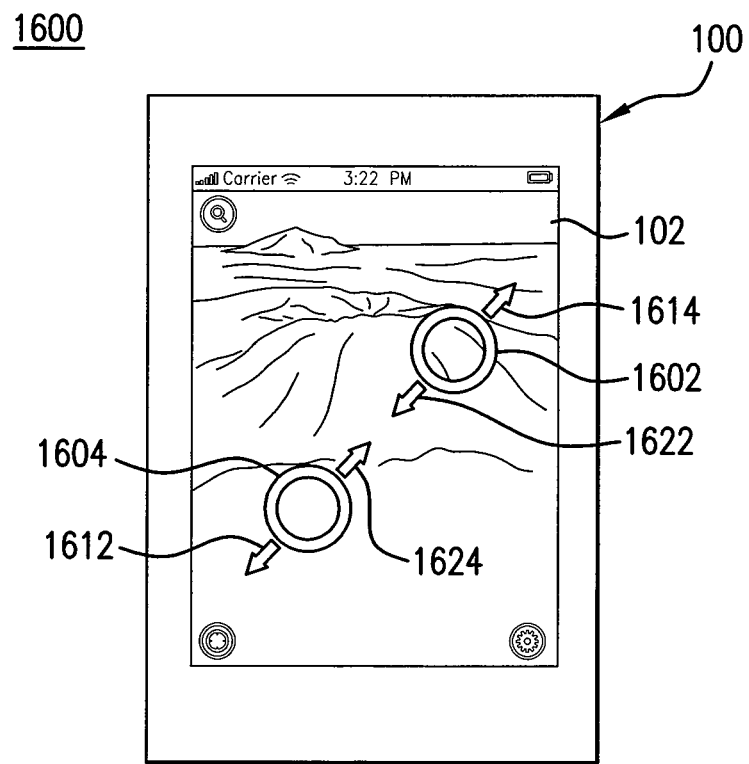
FIGS. 16A-C are diagrams illustrating navigating a virtual camera through a three dimensional environment on a mobile device using a pinch momentum.

FIG. 16A shows a diagram 1600 illustrating a pinch gesture on a mobile device. Diagram 1600 shows mobile device 100 with view 102. A user has touched view with fingers 1604 and 1602. Both fingers are in motion and their relative motion is a speed of the pinch determined in step 1504. Moving fingers 1604 and 1602 apart as shown with arrows 1612 and 1614 may result in a positive pinch speed, whereas moving fingers 1604 and 1602 together as shown with arrows 1624 and 1622 may result in a negative pinch speed.

Based on the pinch speed determined in step 1504, a virtual camera speed is determined at step 1506. The virtual camera speed may be positive (forward) if the pinch speed is positive, and the virtual camera speed may be negative (reverse) if the pinch speed is negative. In an example, the virtual camera speed may be linearly interpolated from the pinch speed. This is just an illustrative example and this not meant to limit the present invention.

At step 1508, the virtual camera accelerates to the speed determined at step 1506. At step 1510, the virtual camera may decelerate gradually. To decelerate the virtual camera, a momentum of the virtual camera may be simulated, and the virtual camera may be exposed to a simulated air resistance. Steps 1508 and 1510 are illustrated in FIG. 16B.

Figure 16B:
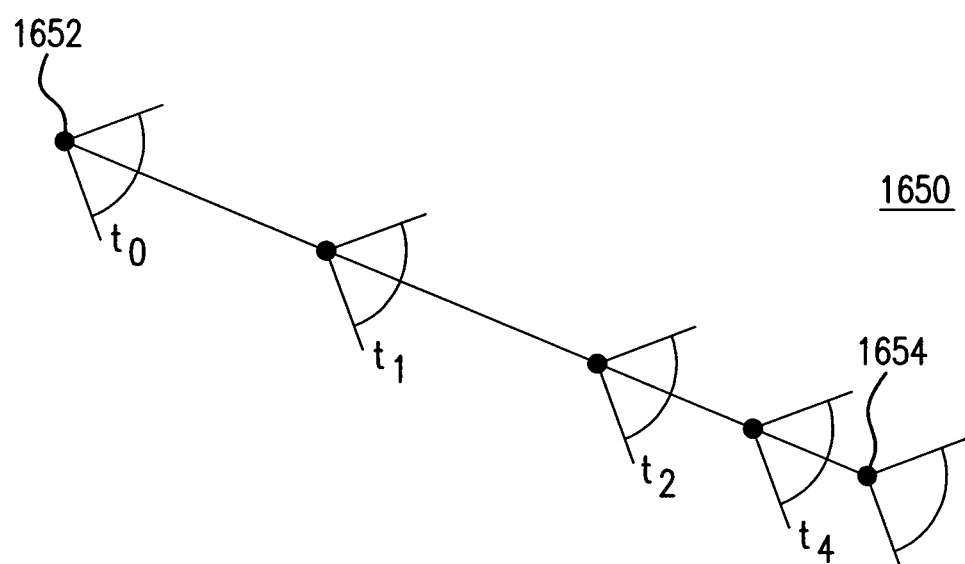

FIG. 16B shows a diagram 1650 illustrating a virtual camera subjected to a pinch momentum. Diagram 1650 shows a virtual camera starting at a position 1652 and ending at a position 1654. Diagram 1650 shows the virtual camera at several points in time $t_0$, $t_1$, $t_2$, $t_3$, $t_4$, and $t_5$. As time passed, the virtual camera decelerates.

In another embodiment, both fingers need not be initially in motion. One or both fingers could be initially stationary. Further, a pinch may translate the virtual camera or cause a virtual camera to zoom without any momentum. In that embodiment, the virtual camera zooms or translates according a distance or speed of the pinch. When the pinch gesture is completed, the virtual camera may stop zooming or translating.

In an embodiment, the virtual camera may be translated in a straight line. Alternatively, the virtual camera may stay stationary and the three dimensional model may move. In an example, the three dimensional model may rotate. This motion of the three dimensional model relative to the virtual camera may be referred to as "panning".

In another embodiment, the virtual camera is both zoomed (or translated) and rotated. The rotation of the camera is based on the angle between the two fingers, and the zoom is based on the distance between the two fingers. These two actions can be done simultaneously. Neither finger needs to be anchored for this gesture, but either finger may be anchored. This embodiment is illustrated in FIG. 16C.

Figure 16C:
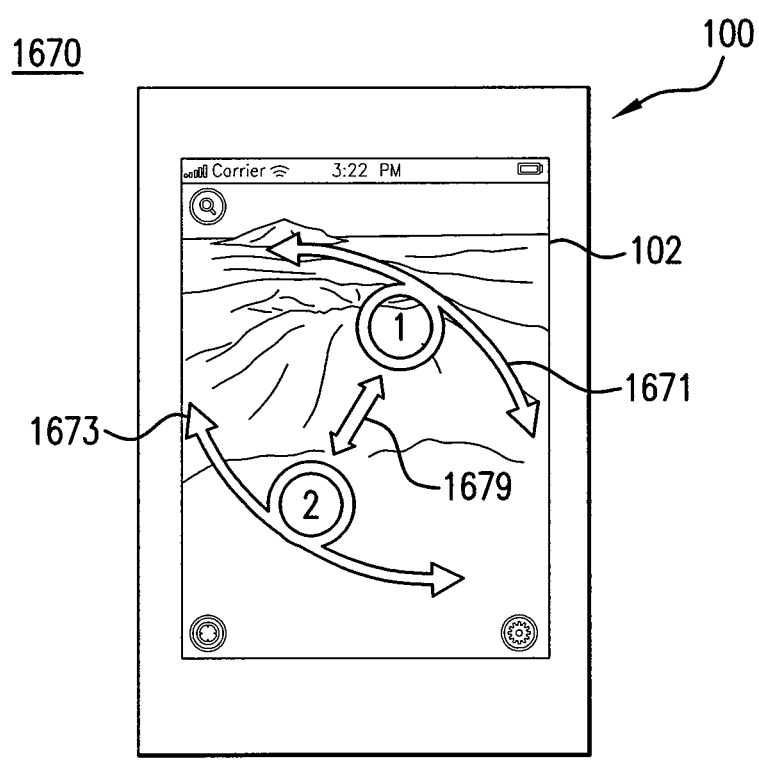

In FIG. 16C, finger 1 and finger 2 are in contact with surface at the same time. Further, finger 1 and finger 2 may be in motion at the same time. Rotating finger 1 and finger 2 as illustrated by arrows 1671 and 1673 may result in rotating the camera around a target point. The target point may be determined by extending a screen ray as described for FIGS. 6A-B. In examples, the screen ray may be determined based on the location of one the fingers, such as the first finger to touch the screen. Alternatively, the screen ray may be determined based on a midpoint between the fingers. In this way, the target point is not covered by one of the user's fingers on the display.

Once the target point is determined, the camera may rotate around the target point. In one embodiment, the camera may rotate around the target point by changing an azimuth value as described for FIG. 11B. In this way, the camera may helicopter around a target point, viewing the target from different perspectives.

In one embodiment, an "invisible" line may be determined connecting finger 1 and finger 2. When a user rotates finger 1 and 2 as illustrated by arrows 1671 and 1673, an angle between the invisible line and the display of the mobile device changes as well. When the angle between the invisible line and the display of the mobile device changes, an azimuth angle relative to a target point may also change. In one embodiment, the azimuth angle may change by the same amount, or approximately the same amount, as the angle between the invisible line and the display of the mobile device. In this way, when a user rotates two fingers on the display of the mobile device by 360 degrees, the virtual camera helicopters 360 degrees around the target point.

Further, changing a distance between finger 1 and finger 2, as illustrated with arrow 1679, may change a range of virtual camera, e.g., by zooming or translating the virtual camera. In one example, an invisible line connecting finger 1 and 2 is determined as described above. When the invisible line decreases in length, the camera may move away from a target point. Similarly, when the invisible line increases in length, the camera may move toward a target point, or vice versa. Changing the range is described above with respect to FIGS. 16A-B. Further, a momentum may be applied to continue the gesture as discussed above. A speed of either the rotation, the zoom, or both may diminish gradually after removal of fingers based on a speed at end of gesture.

In one example operation, the user may rotate finger 1 and 2 counter-clockwise by 90 degrees and may move finger 1 and 2 apart. In that example, the virtual camera may helicopter around the target point by 90 degrees counter-clockwise and may translate closer to the target point. In another example operation, the user may rotate finger 1 and 2 clockwise by 45 degrees and may move finger 1 and 2 closer together. In that example, the virtual camera may helicopter around the target point by 45 degrees clockwise and may translate away from the target point.

By zooming and rotating in a single user interface gesture, embodiments enable a user to navigate easily around a target point and to view a target from different perspectives.

Angular Panning

This section describes panning a virtual camera through a three dimensional environment on a mobile device. In general, a user pans by selecting a position on the view of the mobile device with a finger. Based on the selected position, a target location is determined. As the user drags his finger, the position of the three dimensional model relative to the virtual camera moves to follow the target location. This may be referred to as a touch-and-drag gesture. In an embodiment, the three dimensional model rotates to follow the user's finger in response to the touch-and-drag gesture.

Figure 17:
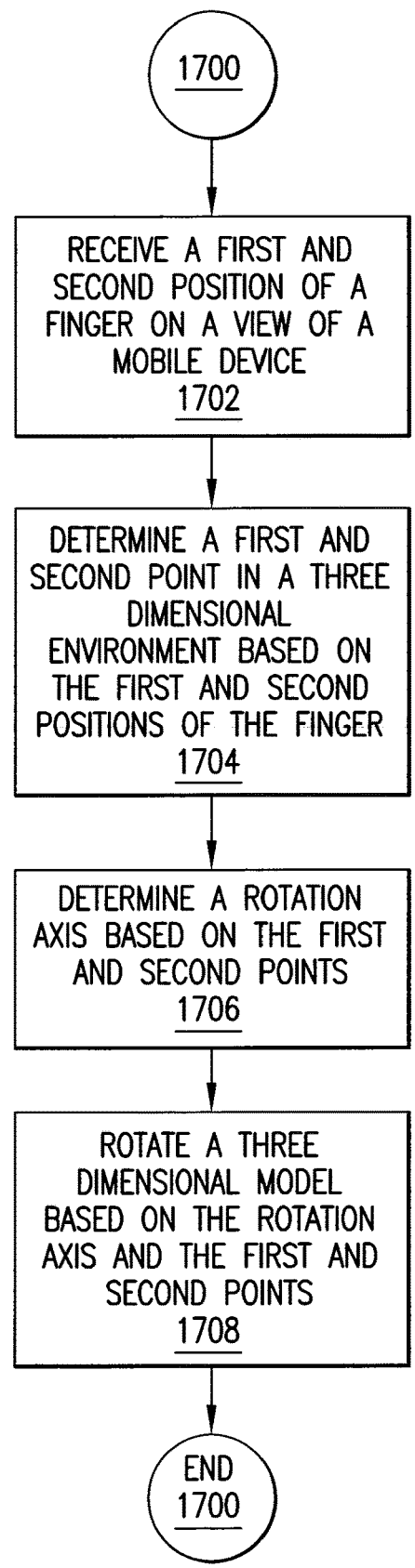
FIG. 17 is a flowchart illustrating a method for panning on a mobile device.
Figure 18A:
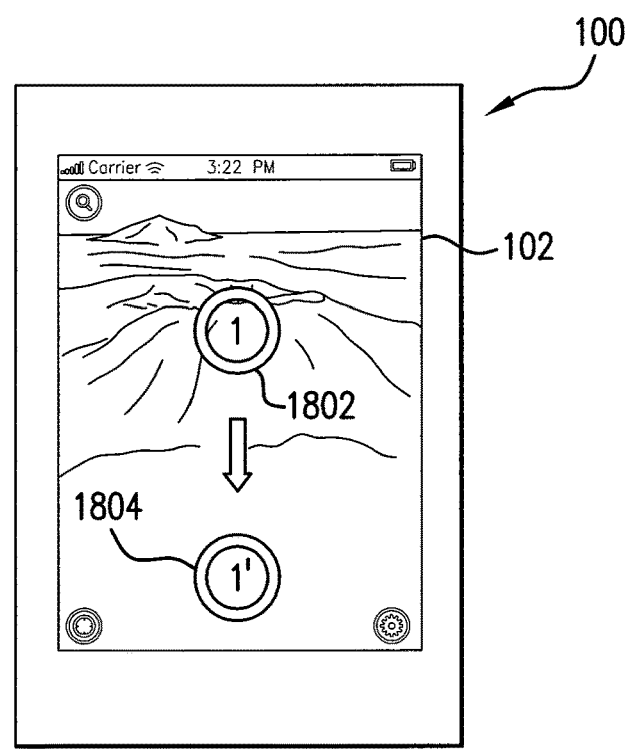
FIGS. 18A-B are diagrams illustrating panning through a three dimensional environment on a mobile device.

FIG. 17 is a flowchart illustrating a method 1700 for panning on a mobile device. Method 1700 begins at step 1702 with receiving a first and second position selected by a user of a mobile device. Selecting the first and second positions is illustrated in FIG. 18A. Each of the first and second position may be defined by an X and Y coordinates on the view. FIG. 18A shows a diagram 1800 illustrating panning on a mobile device. Diagram 1800 shows mobile device 100 with view 102. A user touches a position 1802 with his finger and drags his finger to a new position 1804.

Based on position 1802 and position 1804, first and second target points are determined at step 1704. The first and second target points may be determined with rays as described with respect to FIG. 6A-B. If the ray is nearly tangential to the three dimensional model, the target point may need to be damped as described with respect to FIG. 6B. Each target point may be defined by, for example, a latitude, longitude, and altitude. Altitude (as the term is meant here) may be the distance from the target point to a center of the three dimensional model. In an embodiment, the first target point is determined by intersecting a ray with the three dimensional model and the second target point is determined by intersecting a ray with a virtual surface sphere. Determining the target points is illustrated in FIG. 18B.

Figure 18B:
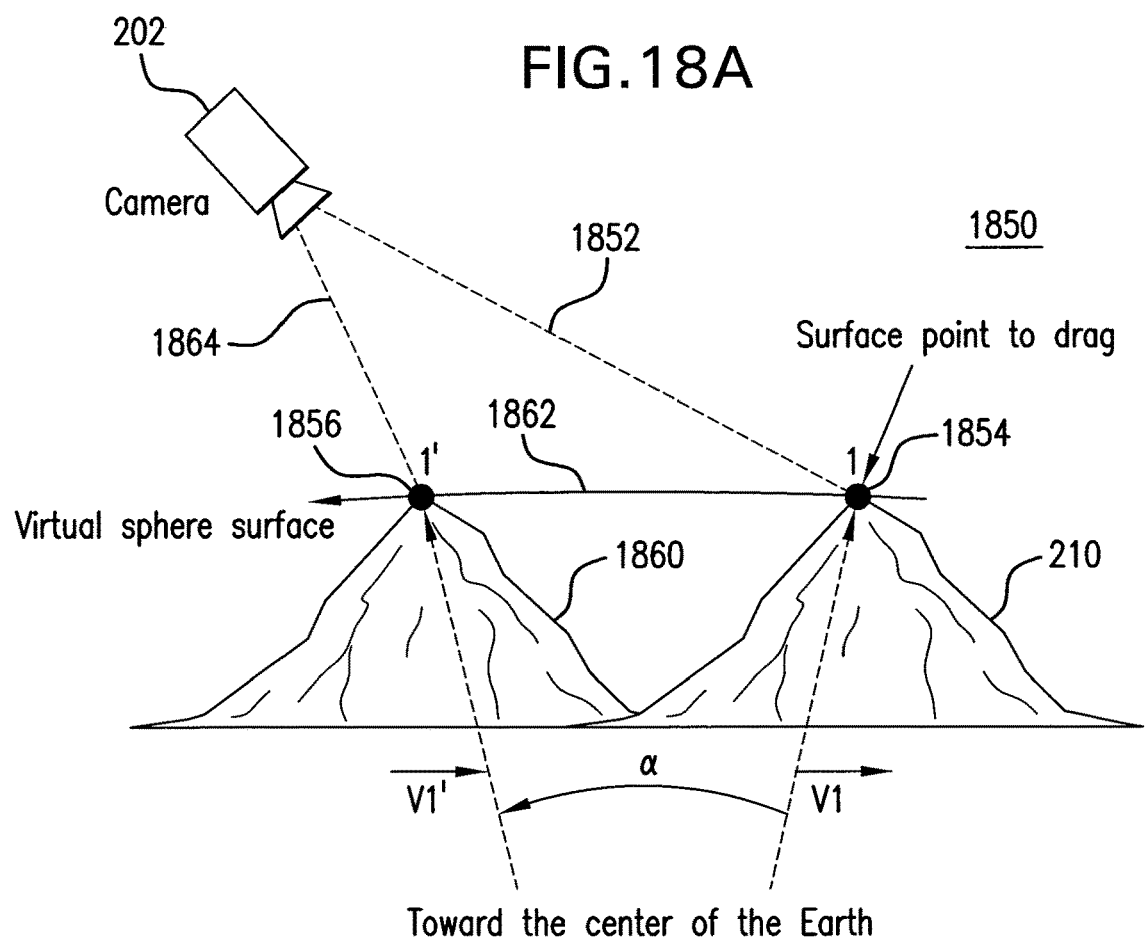

FIG. 18B shows a diagram 1800 with virtual camera 202 facing three dimensional terrain 210. As mentioned earlier, three dimensional terrain 210 may be a portion of a three dimensional model. In an embodiment, the first target point (target point 1854) may be determined by extending a ray 1852 to intersect with the three dimensional model at three dimensional terrain 210. Based on target point 1854, a virtual sphere surface 1862 is determined. Virtual sphere surface 1862 may have a center at the center of the three dimensional model and may be tangent target point 1854. By intersecting a second ray 1864 with virtual sphere surface 1862, a target point 1856 is determined. Alternatively, a virtual surface may not be used and the second target point may be determined by intersecting a ray with the three dimensional model. These two points, target point 1854 and target point 1856, form a geocentric vector relative to the center of the three dimensional model.

Referring back to FIG. 17, once the target points are determined, a rotation axis is determined at step 1706. To compute a rotation axis, cross product between the two target points may be determined. Referring to FIG. 18B, the two target points may be defined by two vectors V1' and V1. The rotation axis is computed by taking the cross product between V1' and V1 (V1'×V1). Once the rotation axis is determined, the three dimensional model is rotated at step 1708. The three dimensional model is rotated by an angle α determined by computing the dot product between the two vectors V1' and V1 (α=V1'·V1). A rotation matrix is computed based on the angle α and the rotation axis. Finally, the three dimensional model is rotated based on the rotation matrix.

Upon the completion of the panning motion, the last screen space position of the finger may be recorded. Further, the panning motion may continue after the user gesture is completed. This gives the feeling to the user that he is spinning a globe. The speed of rotation may decrease gradually to simulate friction.

In this way, a target grabbed by a user with his finger follows the user's finger movements. To the user, it may feel as if he is touching the planet and manipulating it. Due to the size of the view, the first and second positions of the finger cannot be too far apart. This limits the speed at which a user can pan and improves stability of the pan gesture.

There may be several panning modes. When accelerometer navigation is enabled and the mobile device is angled below a certain value, a touch-and-drag gesture may have a different behavior. In that case, while the touch-and-drag gesture in the vertical direction may cause panning as described above with respect FIG. 17, a touch-and-drag gesture in the horizontal direction may cause the virtual camera to look-around. This is illustrated in FIGS. 19A-C.

Figure 19A:
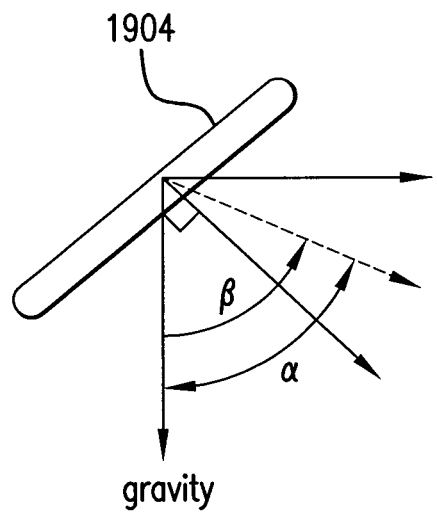
FIGS. 19A-C are diagrams illustrating different panning modes which may be used in navigation on a mobile device.
Figure 19B:
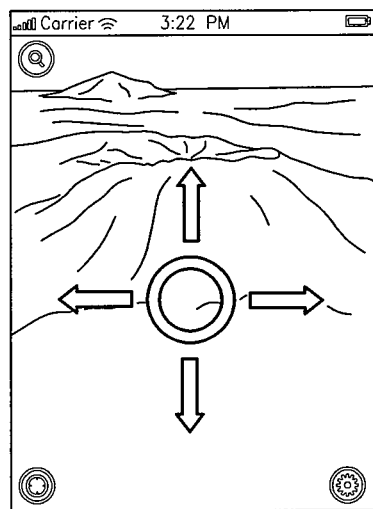
Figure 19C:
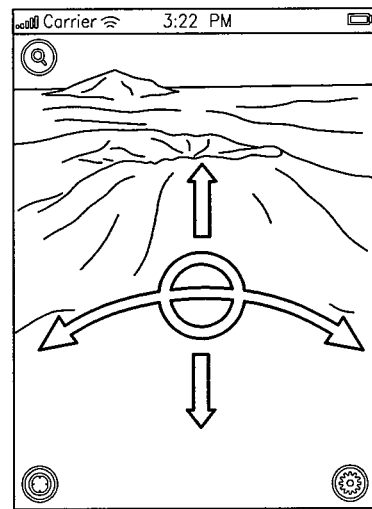

FIG. 19A shows a diagram 1900 illustrating a mobile device 1904. Mobile device 1904 has an accelerometer that detects its angle relative to gravity. When the angle of the mobile device is above a threshold a., a user can pan in all directions as illustrated in diagram 1930 in FIG. 19B. When the of the mobile device is below a threshold a., a touch-and-grab gesture to the left and right does not pan, but causes the virtual camera to look left and right as illustrated in diagram 1960 in FIG. 19C. The virtual camera may look to the left and right by changing a yaw value of the virtual camera.

CONCLUSION

Note that in the preceding description embodiments have for clarity been described with respect to fingers making contact with a touch screen. However, any other object, such as a stylus, may be used as is known to those of skill in the art.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for navigating a virtual camera in a three dimensional environment on a mobile device having a touch screen, comprising:
   receiving a user input indicating that two objects have touched a view of a mobile device and the two objects have moved relative to each other in a pinch gesture;
   determining a positive pinch speed when the two objects have moved apart relative to each other based on the user input;
   determining a negative pinch speed when the two objects have moved together relative to each other based on the user input;
   determining a speed of a virtual camera in a three dimensional environment on the mobile device based on the positive pinch speed or the negative pinch speed determined from the two objects moving relative to each other, wherein the speed of the virtual camera is linearly interpolated from the positive pinch speed or the negative pinch speed; and
   moving the virtual camera within the three dimensional environment according to the speed of the virtual camera that was determined, wherein the virtual camera is moved forward if a positive pinch speed was determined, wherein the virtual camera is moved backward if a negative pinch speed was determined, wherein the movement of the virtual camera within the three dimensional environment gradually decelerates after the pinch gesture is complete, and wherein the deceleration of the movement of the virtual camera after the pinch gesture is complete is based on a speed of the two objects at the end of the pinch gesture.

2. The computer-implemented method of claim 1, wherein the receiving includes receiving the user input indicating that two fingers have touched the view and the two fingers have moved relative to each other.

3. The computer-implemented method of claim 1, further comprising:
   decelerating the virtual camera in the three dimensional environment gradually, whereby the decelerating simulates air resistance to slow the momentum of the virtual camera while moving within the three dimensional environment.

4. The computer-implemented method of claim 1, wherein moving the virtual camera within the three dimensional environment comprises translating the virtual camera.

5. The computer-implemented method of claim 1, wherein moving the virtual camera within the three dimensional environment comprises zooming the virtual camera.

6. The computer-implemented method of claim 1, further comprising:
   receiving a user input indicating that the two objects have rotated relative to each other;
   determining an angle that the two objects have rotated relative to the mobile device based on the received user input indicating that the two objects have rotated relative to each other; and
   changing the position or orientation of the virtual camera according to the angle that the two objects have rotated relative to the mobile device.

7. The computer-implemented method of claim 6, further comprising:
   determining a target location; and
   wherein changing the position or orientation of the virtual camera comprises moving the virtual camera such that an azimuth between a position of the virtual camera and the target location changes according to the angle that the two objects have rotated relative to the mobile device.

8. The computer-implemented method of claim 1, wherein the three dimensional environment includes a three dimensional model of the Earth, and wherein the moving comprises rotating the three dimensional model of the Earth.

9. A system for navigating a virtual camera in a three dimensional environment on a mobile device, comprising:
   a touch receiver that receives a user input indicating that two objects have touched a view of a mobile device and the two objects have moved relative to each other in a pinch gesture;
   a momentum module that:
   determines a positive pinch speed when the two objects have moved apart relative to each other based on the user input;
   determines a negative pinch speed when the two objects have moved together relative to each other based on the user input;
   determines a speed of a virtual camera in a three dimensional environment on the mobile device based on the positive pinch speed or the negative pinch speed determined from the two objects moving relative to each other, wherein the speed of the virtual camera is linearly interpolated from the positive pinch speed or the negative pinch speed; and moves the virtual camera within the three dimensional environment according to the speed of the virtual camera that was determined, wherein the virtual camera is moved forward if a positive pinch speed was determined, wherein the virtual camera is moved backward if a negative pinch speed was determined, and wherein the movement of the virtual camera within the three dimensional environment gradually decelerates after the pinch gesture is complete, and wherein the deceleration of the movement of the virtual camera after the pinch gesture is complete is based on a speed of the two objects at the end of the pinch gesture.

10. The system of claim 9, wherein the touch receiver receives the user input indicating that two fingers have touched the view and the two fingers have moved relative to each other.

11. The system of claim 9, wherein the momentum module decelerates the virtual camera in the three dimensional environment gradually by simulating air resistance to slow the momentum of the virtual camera while moving within the three dimensional environment.

12. The system of claim 9, wherein the momentum module moves the virtual camera within the three dimensional environment by translating the virtual camera.

13. The system of claim 9, wherein the momentum module moves the virtual camera within the three dimensional environment by zooming the virtual camera.

14. The system of claim 9, wherein:
the touch receiver receives a user input indicating that the two objects have rotated relative to each other;
the momentum module determines an angle that the two objects have rotated relative to the mobile device based on the received user input indicating that the two objects have rotated relative to each other; and
the momentum module changes the position or orientation of the virtual camera according to the angle that the two objects have rotated relative to the mobile device.

15. The system of claim 14, wherein:
the system further comprises a target module that determines a target location; and
the momentum module changes the position or orientation of the virtual camera by moving the virtual camera such that an azimuth between a position of the virtual camera and the target location changes according to the angle that the two objects have rotated relative to the mobile device.

16. The system of claim 9, wherein:
the three dimensional environment includes a three dimensional model of the Earth; and the momentum module moves by rotating the three dimensional model of the Earth.

17. A mobile device, comprising:
a touch screen forming a view that accepts touch input from a user of the mobile device, wherein the view further outputs images to a user, the images comprising a three dimensional environment including a three dimensional model of the Earth;
a touch receiver that receives a user input indicating that two objects have touched a view of a mobile device and the two objects have moved relative to each other in a pinch gesture;
a user interaction module comprising:
a momentum module that:
determines a positive pinch speed when the two objects have moved apart relative to each other based on the user input;
determines a negative pinch speed when the two objects have moved together relative to each other based on the user input;
determines a speed of a virtual camera in a three dimensional environment on the mobile device based on the positive pinch speed or the negative pinch speed determined from the two objects moving relative to each other, wherein the speed of the virtual camera is linearly interpolated from the positive pinch speed that was determined or the negative pinch speed that was determined; and
moves the virtual camera within the three dimensional environment according to the speed of the virtual camera that was determined, wherein the virtual camera is moved forward if a positive pinch speed was determined, wherein the virtual camera is moved backward if a negative pinch speed was determined, wherein the movement of the virtual camera within the three dimensional environment gradually decelerates after the pinch gesture is complete, and wherein the deceleration of the movement of the virtual camera after the pinch gesture is complete is based on a speed of the two objects at the end of the pinch gesture; and
a motion model that constructs a view specification defining a view frustum of the virtual camera and the position and orientation of the frustum in the three dimensional environment, wherein the view specification is determined at least in part from the input from the touch screen as provided by the touch receiver to the user interaction module; and
a renderer module that draws geographic data on the view by using the view specification constructed by the motion model.

18. The mobile device of claim 17, wherein the momentum module decelerates the virtual camera in the three dimensional environment gradually by simulating air resistance to slow the momentum of the virtual camera while moving within the three dimensional environment.

19. The mobile device of claim 17, wherein:
the touch receiver receives a user input indicating that the two objects have rotated relative to each other;
the momentum module determines an angle that the two objects have rotated relative to the mobile device based on the received user input indicating that the two objects have rotated relative to each other; and
the momentum module changes the position or orientation of the virtual camera according to the angle that the two objects have rotated relative to the mobile device.

20. The mobile device of claim 17, wherein:
the user interaction module further comprises a target module that determines a target location; and
the momentum module changes the position or orientation of the virtual camera by moving the virtual camera such that an azimuth between a position of the virtual camera and the target location changes according to the determined angle.

* * * * *